(12) United States Patent
Yasui

(10) Patent No.: US 7,725,239 B2
(45) Date of Patent: May 25, 2010

(54) PLANT CONTROL SYSTEM

(75) Inventor: Yuji Yasui, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 385 days.

(21) Appl. No.: 11/664,696

(22) PCT Filed: Sep. 22, 2005

(86) PCT No.: PCT/JP2005/017499

§ 371 (c)(1),
(2), (4) Date: Apr. 5, 2007

(87) PCT Pub. No.: WO2006/038474

PCT Pub. Date: Apr. 13, 2006

(65) Prior Publication Data

US 2009/0125208 A1    May 14, 2009

(30) Foreign Application Priority Data

Oct. 7, 2004    (JP)  ............................. 2004-295261

(51) Int. Cl.
*G06F 19/00* (2006.01)
*G06F 17/00* (2006.01)
*G05B 13/02* (2006.01)
(52) U.S. Cl. ........................ 701/103; 701/102; 700/54
(58) Field of Classification Search ......... 701/101–105, 701/114, 115; 700/54
See application file for complete search history.

(56) References Cited

U.S. PATENT DOCUMENTS

| | | | |
|---|---|---|---|
| 5,182,703 A * | 1/1993 | Yamamoto | 700/54 |
| 6,094,602 A | 7/2000 | Schade, III | |
| 6,195,988 B1 * | 3/2001 | Yasui et al. | 60/285 |
| 6,286,494 B1 * | 9/2001 | Ishii et al. | 123/696 |
| 6,363,316 B1 * | 3/2002 | Soliman et al. | 701/104 |
| 6,520,168 B2 * | 2/2003 | Ishii et al. | 123/695 |
| 6,922,617 B2 * | 7/2005 | Kogure et al. | 701/1 |
| 7,363,891 B2 * | 4/2008 | Shimojo et al. | 123/90.15 |
| 7,451,036 B2 * | 11/2008 | Fuwa et al. | 701/103 |
| 2001/0008990 A1 * | 7/2001 | Ishii et al. | 701/109 |
| 2002/0107630 A1 * | 8/2002 | Yagi | 701/102 |

FOREIGN PATENT DOCUMENTS

| | | |
|---|---|---|
| DE | 38 33 881 A1 | 4/1990 |
| DE | 196 03 091 C1 | 7/1997 |
| JP | 63-26702 A | 2/1988 |

(Continued)

*Primary Examiner*—Stephen K Cronin
*Assistant Examiner*—Johnny H Hoang
(74) *Attorney, Agent, or Firm*—Arent Fox LLP

(57) ABSTRACT

In a system calculating control input Ucain based on the linear controller that calculates a provisional input Usl to converge an output of the plant to a desired value in accordance with response-specifying control algorithm based on the linear element and on the nonlinear compensator, the nonlinear characteristic adapter is provided for correcting the nonlinear compensator based on an error e_nl between an output estimated value Cain_est of the plant calculated by the controlled object model solely comprising the linear element and the output Cain of the plant. With this, even when the nonlinear characteristics of the plant change due to manufacturing variance or aging degradation, it becomes possible to accurately compensate the nonlinear characteristics by the nonlinear compensator.

12 Claims, 19 Drawing Sheets

FOREIGN PATENT DOCUMENTS

| | | |
|---|---|---|
| JP | 63-92903 | 6/1988 |
| JP | 4-339009 A | 11/1992 |
| JP | 5-294173 A | 11/1993 |
| JP | 5-333905 A | 12/1993 |
| JP | 07-210207 A | 8/1995 |
| JP | 10-214102 A | 8/1998 |

* cited by examiner

PLANT CONTROL SYSTEM

CROSS-REFERENCE TO RELATED APPLICATION

This application is a National Stage entry of International Application No. PCT/JP2005/017499, filed Sep. 22, 2005, the entire specification claims and drawings of which are incorporated herewith by reference.

TECHNICAL FIELD

This invention relates to a plant control system.

BACKGROUND ART

It has been known, when a plant (controlled object) has nonlinear characteristics, to model the plant by linear elements and nonlinear elements, to correct inputs determined by a linear controller through a nonlinear compensator so as to determine the final control input, as taught, for example, by Patent Reference 1 mentioned below. By the use of such a nonlinear compensator, the technique described in Patent Reference 1 has an advantage that can control a plant having nonlinear characteristics with high accuracy.

Patent Reference 1: Japanese Laid-Open Patent Application Hei 9 (1997)-297240.

DISCLOSURE OF THE INVENTION

Problems to be Solved by the Invention

However, in the technique described in Patent Reference 1, if an error arises between the nonlinear characteristics supposed at the time when the nonlinear compensator was designed and the nonlinear characteristics of the actual plant, the nonlinear compensation can not be done accurately, thereby disadvantageously degrading the control ability. For that reason, in the control using a nonlinear compensator, a technique to adapt or match nonlinear compensation in the nonlinear compensator to actual nonlinear characteristics has long been waited for.

An object of this invention is therefore to solve the foregoing problem by providing a plant control system that can adapt or match nonlinear compensation of a nonlinear compensator to actual nonlinear characteristics.

Means for Solving the Problems

In order to achieve the object, as recited in claim 1, this invention provides a system for controlling a plant (42, 44) having a linear element and a nonlinear element, comprising: a linear controller (110) that calculates a provisional input Usl to converge an output (Cain, Cr) of the plant to a desired value (Cain_cmd, Cr_cmd) in accordance with control algorithm based on the linear element; a nonlinear compensator (112) that is set to cancel the provisional input and characteristics of the nonlinear element of the plant using a nonlinear function that inputs the provisional input Usl and calculates a control input Ucair, Ucr; and a nonlinear characteristic adaptor (140) that corrects the nonlinear compensator based on an error e_nl between an output estimated value Cain_est Cr_est of the plant calculated by an estimation model (114a) solely comprising the linear element and the output Cain, Cr of the plant.

As recited in claim 2 mentioned below, this invention provides the system wherein the nonlinear characteristic adapter (114) corrects the nonlinear compensator in accordance with response-specifying control algorithm such that the error e_nl between the output estimated value Cain_est, Cr_est and the output Cain, Cr becomes zero.

As recited in claim 3 mentioned below, the invention provides the system further including: an adaptive disturbance observer (102) that calculates a disturbance estimated value c1 applied to the plant; and the nonlinear characteristic adapter (114) calculates the output estimated value Cain_est, Cr_est based on a value Uest obtained by eliminating a term concerning the disturbance estimated value c1 from the control input Ucain, Ucr.

As recited in claim 4 mentioned below, this invention provides the system further including: an adaptive disturbance observer (102) that calculates a disturbance estimated value c1 applied to the plant; and the nonlinear characteristic adapter (114) calculates the output estimated value Cain_est, Cr_est based on a value Uest obtained by eliminating a term concerning the disturbance estimated value c1 from the control input Ucain, Ucr.

As recited in claim 5 mentioned below, this invention provides the system wherein the plant is a variable phase mechanism that variably regulates a phase of an intake valve of an internal combustion engine.

As recited in claim 6 mentioned below, this invention provides the system wherein the plant is a variable compression ratio mechanism that regulates a compression ratio of an internal combustion engine.

EFFECTS OF THE INVENTION

In the plant control system recited in claim 1, since in a system calculating control input Ucain, Ucr based on a linear controller that calculates a provisional input Usl to converge an output (Cain, Cr) of the plant to a desired value (Cain_cmd, Cr_cmd) in accordance with control algorithm based on the linear element, a nonlinear compensator (112) that is set to cancel the provisional input and characteristics of the nonlinear element of the plant using a nonlinear function that inputs the provisional input Usl and calculates a control input Ucair, Ucr; and; a nonlinear characteristic adaptor (140) is provided that corrects the nonlinear compensator based on an error e_nl between an output estimated value Cain_est, Cr_est of the plant calculated by an estimation model (114a) solely comprising the linear element and the output Cain, Cr of the plant, even when the nonlinear variance or aging degradation, it becomes possible to accurately compensate the nonlinear characteristics by the nonlinear compensator, and to control the plant output to its desired value with high accuracy and high response.

In the plane control system recited in claim 2, since the nonlinear characteristic adapter (114) corrects the nonlinear compensator in accordance with response-specifying control algorithm such that the error e_nl between the output estimated value Cain_est, Cr_est and the output Cain, Cr becomes zero, in addition to the effects mentioned above, it becomes possible to improve the control ability, since it becomes possible to make the correction of the nonlinear compensator immediately without causing overshooting to occur.

In the plant control system recited in claim 3, since the system further includes an adaptive disturbance observer (102) that calculates a disturbance estimated value c1 applied to the plant; and the nonlinear characteristic adapter (114) correcting means calculates the output estimated value Cain- _est, Cr_est based on a value Uest obtained by eliminating a term concerning the disturbance estimated value c1 from the control input Ucain, Ucr, in addition to the effects mentioned above, it becomes possible to prevent the plant output from exhibiting overshooting relative to the desired value and to further improve the control ability, since the disturbance compensation by the disturbance estimated value c1 and correction of nonlinear compensator do not interfere with each other.

In the plant control system recited in claim 4, since the system further includes: an adaptive disturbance observer (102) that calculates a disturbance estimated value c1 applied to the plant; and the nonlinear characteristic adapter (114) calculates the output estimated value Cain_est, Cr_est using the disturbance estimated value c1, in addition to the effects mentioned above, it becomes similarly possible to prevent the plant output from exhibiting overshooting relative to the desired value and to further improve the control ability, since the disturbance compensation by the disturbance estimated value c1 and correction of the nonlinear compensator do not interference with each other.

In the plant control system recited in claim 5, since the plant is a variable phase mechanism that variably regulates a phase of an intake valve of an internal combustion engine, in addition to the effects mentioned above, it becomes possible to control the phase of the intake valve (valve opening/closing timing) to a desired phase with high accuracy and high response, without causing overshooting to occur.

In the plant control system recited in claim 6, since the plant is a variable compression ratio mechanism that regulates a compression ratio of an internal combustion engine, in addition to the effects mentioned above, at the time of switching increase/decrease of the compression ratio, it becomes possible to control to change the compression ratio, not abruptly, but smoothly.

BEST MODES OF CARRYING OUT THE INVENTION

Preferred embodiments for carrying out a plant control system according to the present invention will now be explained with reference to the attached drawings.

First Embodiment

Figure 1:
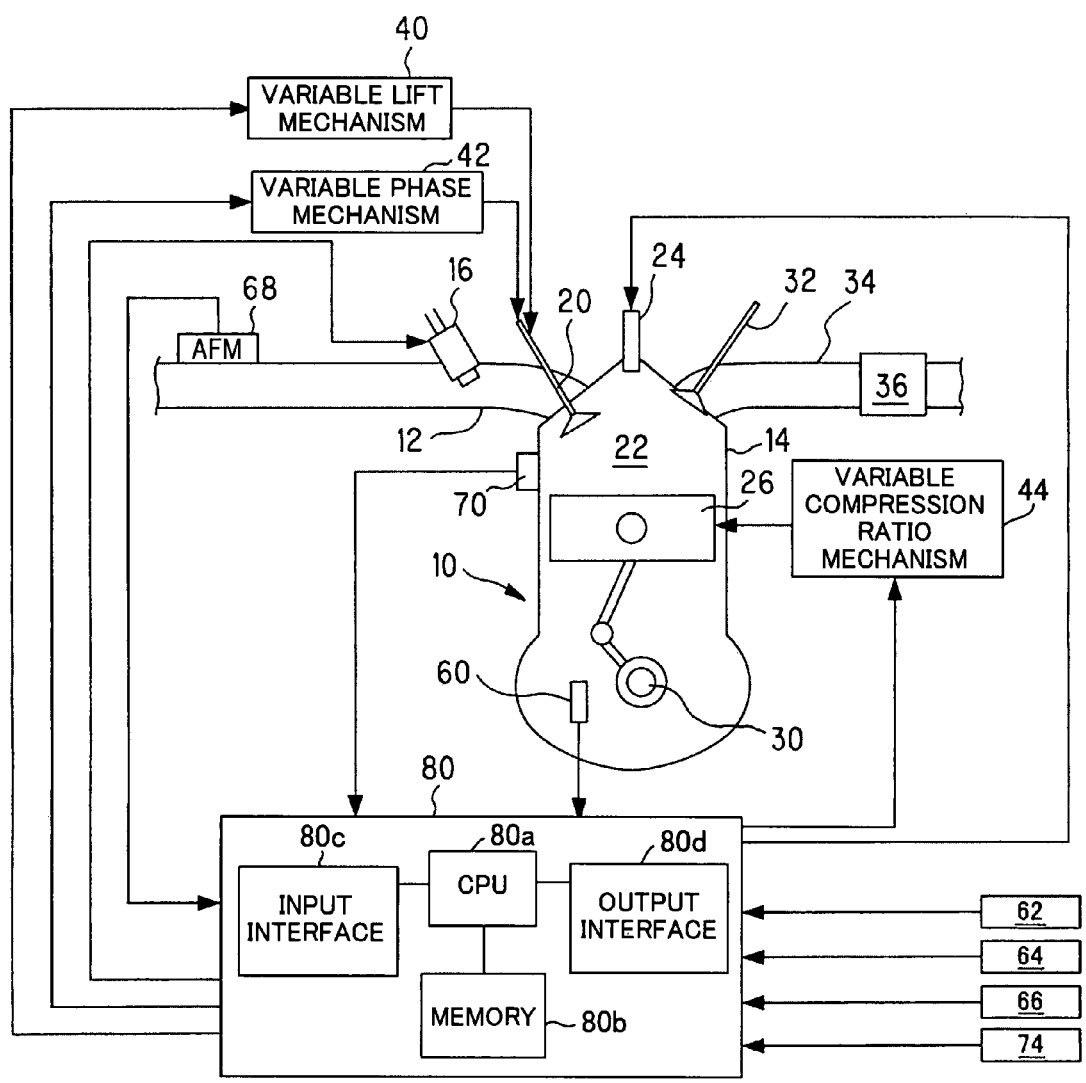
FIG. 1 is a schematic diagram showing the overall structure of a plant control system according to a first embodiment of this invention.

FIG. 1 is a schematic diagram showing the overall structure of a plant control system according to the first embodiment of the invention.

It should be noted that a control system of an internal combustion engine, more specifically a system that variably controls the phase of intake valves (and exhaust valves), i.e., valve opening/closing timing of the engine, is taken as an example of a plant control system.

Explaining this, the symbol 10 designates an internal combustion engine (hereinafter called "engine") comprising a four-cycle, four-cylinder, DOHC (double overhead cam), gasoline engine. The engine 10 is equipped with an air intake pipe 12. Air sucked into the air intake pipe 12 through an air cleaner (not shown) flows through an intake manifold (not shown). A fuel injector 16 is installed near the intake ports of each of the four cylinders 14 (only one shown). When energized, the injectors 16 inject fuel (gasoline) into the intake air.

When the two intake valves (only one shown) 20 open, the produced air-fuel mixture flows into a combustion chamber 22 to be ignited by a spark plug 24. The resulting explosive combustion drives a piston 26 downward as viewed in the drawing to rotate a crankshaft 30. When the two exhaust valves (only one shown) 32 open, the exhaust gas produced by the combustion passes through an exhaust manifold and an exhaust system 34 connected thereto to be discharged to the exterior of the engine 10 after being purified by a catalytic converter 36.

The engine 10 is equipped with a variable lift mechanism 40 for variably regulating the lift or valve opening height of the intake valves 20, a variable phase mechanism 42 for variably regulating the phase of an intake camshaft and an exhaust camshaft that drive the intake valves 20 and the exhaust valves 32 (thereby regulating the timing of valve opening and closing), and a variable compression ratio mechanism 44 for variably regulating the compression ratio by changing the top dead center (and bottom dead center) of the pistons 26.

The variable lift mechanism 40 will be explained first.

Figure 2:
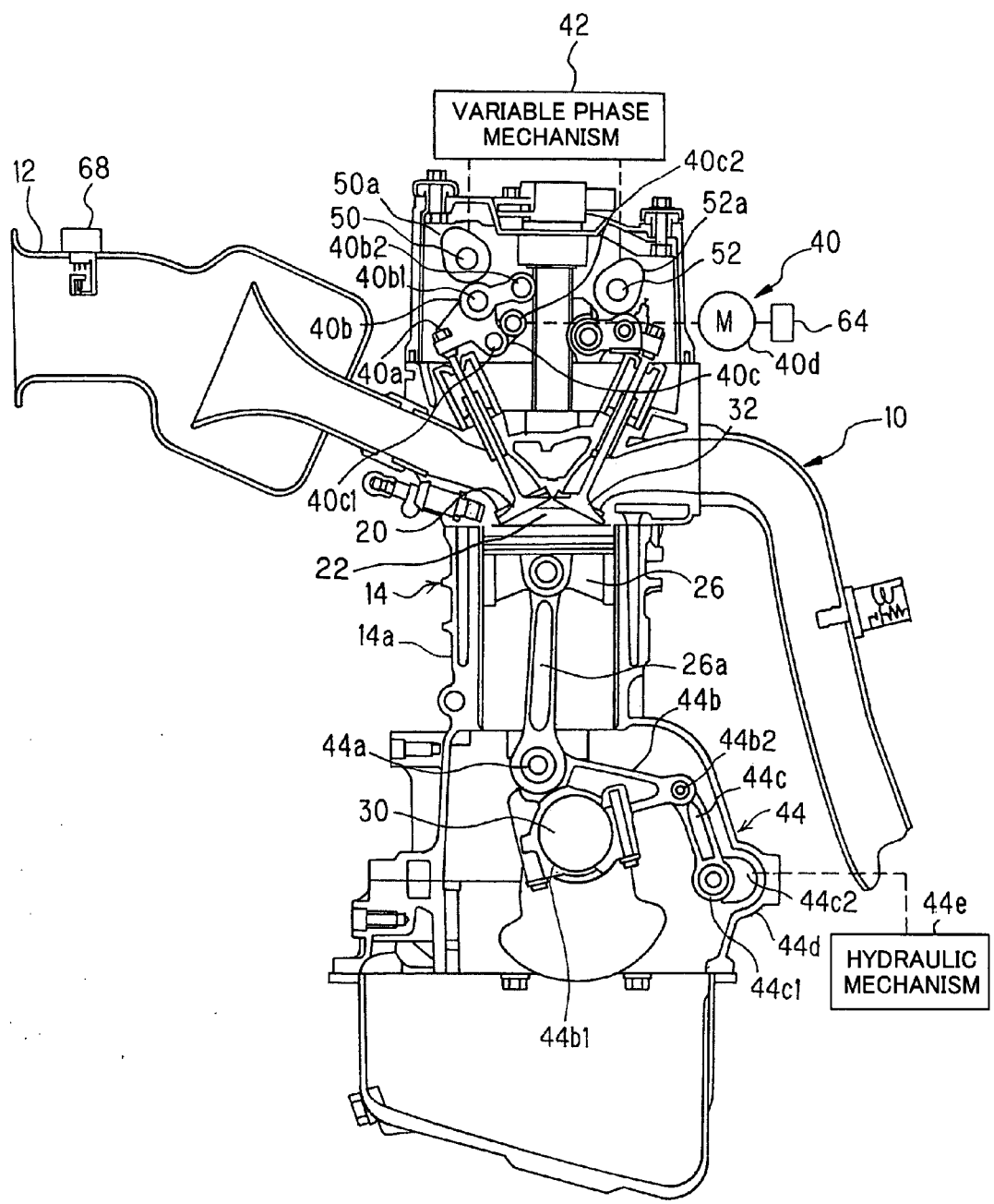
FIG. 2 is a side view specifically showing an internal combustion engine shown in FIG. 1 with focus on a valve operating system.

FIG. 2 is a side view showing the engine 10 of FIG. 1 more concretely with focus on the valve operating system of the engine 10. As illustrated, an intake camshaft 50 and an exhaust camshaft 52 are installed in parallel above the intake valves 20 and exhaust valves 32. They are connected to the crankshaft 30 through timing belts or the like (not shown) so that each is rotated at one-half the rotational speed of the crankshaft 30.

Intake cams 50a are attached to the intake camshaft 50. A rocker arm 40a is provided near each intake cam 50a with its one end in contact with the intake cam 50a and its other end in contact with the tip of the stem of the associated intake valve 20. An upper link arm 40b is connected to the rocker arm 40a by a link pin 40b1 and a lower link arm 40c is connected thereto by a link pin 40c1. The upper link arm 40b is fastened to the cylinder block (engine main body) 14a by another link pin 40b2.

Another link pin 40c2 of the lower link arm 40c is connected to a movable shaft (control shaft; not shown) lying parallel to the crankshaft 30. The movable shaft is connected to an electric motor 40d through reduction gearing (not shown). Rotation of the movable shaft by the motor 40d via the reduction gearing moves the center of rotation where the line connecting link pins 40b1, 40b2 of the upper link arm 40b and the line connecting the link pins 40c1, 40c2 of the lower link arm 40c intersect, thereby changing the distance between the intake cam 50a and rocker arm 40a to change or regulate the amount of lift of the intake valve 20.

The variable phase mechanism 42 will be explained next. The variable phase mechanism 42 is connected to the intake camshaft 50.

Figure 3:
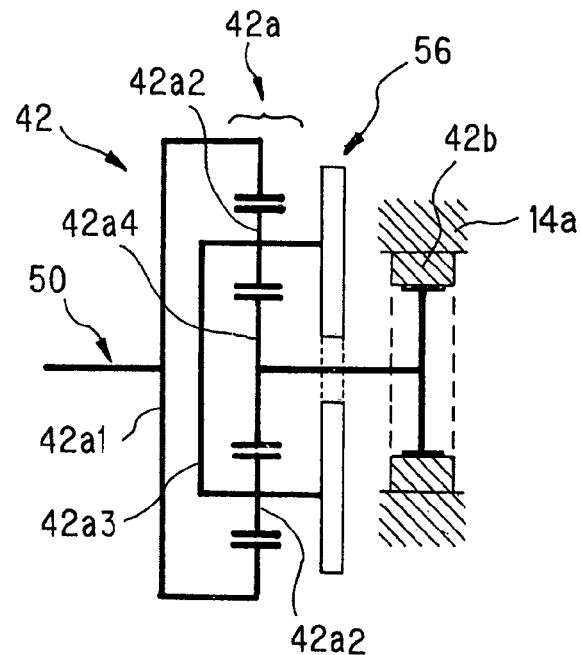
FIG. 3 is a side view showing a variable phase mechanism shown in FIG. 1.
Figure 4:
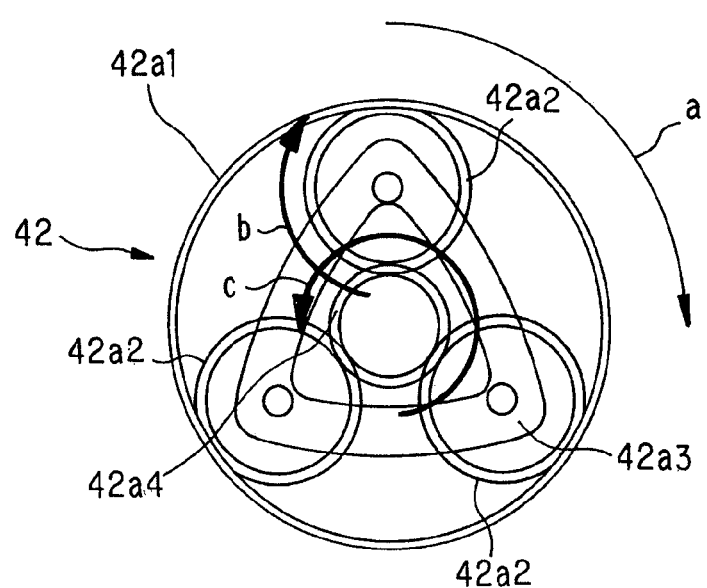
FIG. 4 is a front view showing the variable phase mechanism shown in FIG. 3.
Figure 5:
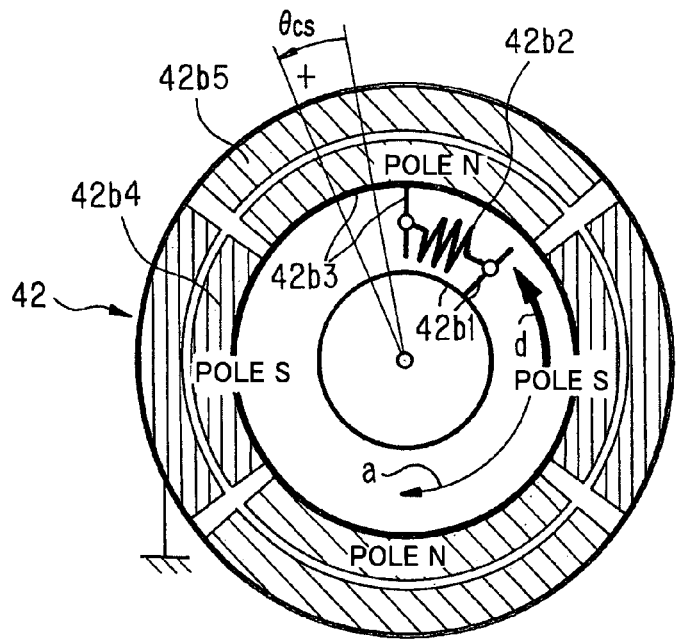
FIG. 5 is a front view schematically showing the structure of an electromagnetic brake in the variable phase mechanism shown in FIG. 3.

FIG. 3 is a side view schematically showing the variable phase mechanism 42, FIG. 4 is a front view thereof and FIG. 5 is a front view schematically showing the structure of an electromagnetic brake therein.

The explanation will be made in reference with FIGS. 3 to 5. The variable phase mechanism 42 is equipped with a planetary gear mechanism 42a and an electromagnetic brake 42b fastened to the cylinder block 14a. A ring gear 42a1 of the planetary gear mechanism 42a is fastened to the intake camshaft 50. Three planetary gears 42a2 mesh with the ring gear 42a1 at intervals of 120 degrees.

As best shown in FIG. 4, the three planetary gears 42a2 are interconnected by a carrier 42a3 having the shape of an equilateral regular triangle in plan view and, as shown in FIG. 3, are connected through the carrier 42a3 to a sprocket 56 that is driven by the crankshaft 30. The carrier 42a3 is connected through a connector 42b1 of the electromagnetic brake 42b shown in FIG. 5 to one end of a return spring (compression spring) 42b2.

A sun gear 42a4 meshes with the three planetary gears 42a2. The sun gear 42a4 is similarly fastened to a connector 42b3 of the electromagnetic brake 42b shown in FIG. 5 and connected through the connector 42b3 to the other end of the return spring 42b2.

As shown in FIG. 5, the electromagnetic brake 42b includes an annular permanent magnet 42b4 located on the outer periphery of the annular connector 42b3 to which the sun gear 42a4 is connected and an annular electromagnet 42b5 located on the outer periphery of the permanent magnet 42b4. The permanent magnet 42b4 has a bipolar structure composed of four magnetic pole pieces arranged with alternating north-south polarities.

The electromagnet 42b5 is composed of four conductors, i.e., laminated steel plates arranged in one-to-one correspondence with the four magnetic pole pieces. The conductors are wound with coils (not shown) that are applied with energizing current by an energizing circuit (not shown) to be magnetized in the north pole or south pole depending on the energization direction. Thus the electromagnetic brake 42b resembles a DC motor in structure.

The return spring 42b2 operates through the connectors 42b1, 42b3 to bias the sun gear 42a4 clockwise relative to the carrier 42a3 as viewed in FIG. 5. That is, the sun gear 42a4 is biased in the retarded direction, specifically in the direction of retarding the opening (and closing) of the intake valves 20 relative to the rotation of the crankshaft 30.

In the variable phase mechanism 42 of the illustrated structure, the sprocket 56 is rotated one-half turn in the direction of the arrow a in FIG. 4 with rotation of the crankshaft 30. The rotation of the sprocket 56 is transmitted through the carrier 42a3 to the planetary gears 42a2 to rotate them in the direction of the arrow b in FIG. 4. As a result, the ring gear 42a1 and the intake camshaft 50 connected thereto are rotated in the same direction as the direction of rotation of the sprocket 56 (direction of arrow a) and the sun gear 42a4 is rotated in the direction indicated by the arrow c in FIG. 4.

If at this time the electromagnet 42b5 is energized to brake the rotation of the permanent magnet 42b4 connected to the sun gear 42a4 through the connector 42b3, the intake camshaft 50 will be moved relative to the sprocket 56 in the advanced direction indicated by the arrow d in FIG. 5 by an amount proportional to the braking force, thereby moving ahead or angularly advancing the contact point between the intake cam 50a and rocker arm 40a relative to the crank angle.

Therefore, when the sun gear 42a4 has rotated relatively by a certain angle to bring the braking force and the return spring force into equilibrium, the planetary gears 42a2 stop operating, so that the sprocket 56 and intake camshaft 50 rotate unitarily while maintaining the certain angle therebetween. In other words, the cam phase is controlled in the advanced and retarded directions by increasing and decreasing the braking force. Although the detailed description is omitted, the phase, i.e., timing of valve opening and closing of the exhaust valves 32 is variably regulated (controlled) by a similar variable phase mechanism 42 connected to the exhaust camshaft 52.

The variable compression ratio mechanism 44 will now be explained. As shown in FIG. 2, a first link 44b of substantially triangular shape in plan view is connected to a connecting rod 26a of the piston 26 by a link pin 44a.

The first link 44b is formed at a location eccentric or radially offset from the link pin 44a with a hole 44b1 for rotatably accommodating the crankshaft 30 and one end thereof is connected to a second link 44c by a link pin 44b2. A smaller-diameter link pin 44c1 provided at the tip of the second link 44c is eccentrically connected to a larger-diameter movable shaft (control shaft) 44c2 formed at the tip of a third link 44d fastened to the cylinder block 14a.

The movable shaft 44c2 is rotated by a hydraulic mechanism 44e, thereby at the four-joint linkage composed of the first link 44b, second link 44c and third link 44d, changing the TDC (top dead center; and BDC (bottom dead center)) of the pistons 26 to variably regulate or control the compression ratio of the combustion chambers 22.

The explanation of FIG. 1 will be resumed. A crankshaft sensor 60 installed near the crankshaft 30 outputs a cylinder discrimination signal for specifying the crank angle positions at the four cylinders 14, a TDC signal indicative of a position related to the TDC of the four pistons 26, and a signal indicative of unit crank angles, for example, crank angle signals (CRK signals) produced at every one degree.

A camshaft sensor 62 installed near the intake camshaft 50 (shown in FIG. 2) produces an output or signal at every predetermined angle of rotation, e.g., every one degree of rotation, of the intake camshaft 50. A lift sensor 64 constituted as rotary encoder or the like and installed near the reduction gearing of the motor 40d in the variable lift mechanism 40 produces an output or signal corresponding to the amount of lift or amount of valve opening Liftin of the intake valves 20 owing to the geared-down rotation of the motor 40d. A compression ratio sensor 66 installed near the hydraulic mechanism 44e in the variable compression ratio mechanism 44 uses the detected stroke or amount of rotation of the hydraulic mechanism 44e to produce an output corresponding to the actual compression ratio Cr of the combustion chambers 22.

An airflow meter (AFM) 68 installed near the end of the air intake pipe 12 produces an output or signal corresponding to the intake air quantity Q. A water temperature sensor 70 installed near a coolant channel (not shown) of the cylinder 14 produces an output or signal indicative of the coolant temperature TW of the engine 10.

An accelerator position sensor 74 is installed near the accelerator pedal (not shown) provided on the floor near the driver's seat of the vehicle (not shown) in which the engine 10 is mounted and produces an output or signal corresponding to the accelerator opening or depression amount AP produced by the driver's depression of the accelerator pedal.

The outputs of the forgoing sensors are sent to an ECU (Electronic Control Unit) 80. As shown in the drawing, the ECU 80 is composed of a microcomputer comprising a CPU 80a, memory 80b, input interface 80c and output interface 80d, and also including an A/D converter circuit, waveforming circuit, counter and other components that are not shown in the drawing.

The outputs of some sensors, including the crankshaft sensor 60, are wave-formed by the wave-forming circuit, while the outputs of others, including the airflow meter (AFM) 68, are converted to digital values by the A/D converter circuit. The ECU 80 detects the engine speed NE by using the counter to count the CRK signals outputted by the crankshaft sensor 60. In addition, it detects the cam phase Cain (timing of the opening and closing of the intake valves 20) based on the CRK signals and the output of the camshaft sensor 62.

The ECU 80 controls variable mechanisms including the variable phase mechanism 42, fuel injection quantity and ignition timing of the engine 10 based on the foregoing values and other sensor outputs, as explained later.

Figure 6:
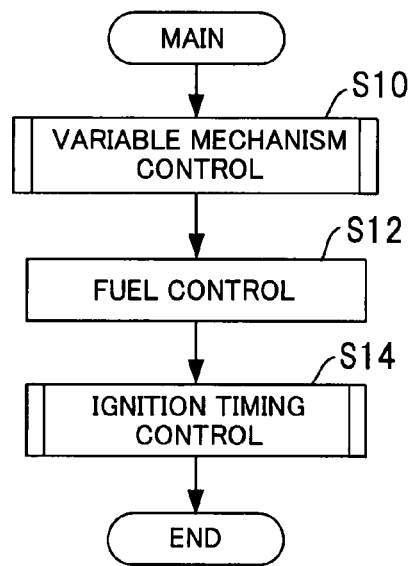
FIG. 6 is a flowchart showing the operation of an ECU shown in FIG. 1.

FIG. 6 is a flowchart showing the processing of the operation of the ECU 80.

Explaining this, in S10, the variable mechanisms are controlled. Specifically, based on the operating state of the engine 10 detected from the sensor outputs, the variable lift mechanism 40, variable phase mechanism 42 and variable compression ratio mechanism 44 are controlled such that the intake air quantity of the engine 10 is optimized under the detected operating state. The processing of S10 starts at starting of the engine 10 and executed at every predetermined interval, e.g., every 10 milliseconds.

Next in S12, fuel control to calculate the fuel injection quantity based on the intake air quantity is conducted, and in S14, the ignition timing is controlled also based on the intake air quantity. The processing of S12 and S14 starts at starting of the engine 10 and executed synchronously with the TDC or crank angle thereabout.

Before making the detailed explanation of the operation of the flowchart in FIG. 7, a problem to be solved by this invention will be explained.

As mentioned above, in the technique described in Patent Reference 1, if an error arises between the nonlinear characteristics supposed at the time when the nonlinear compensator was designed and the nonlinear characteristics of the actual plant, the nonlinear compensation can not be done accurately, thereby disadvantageously degrading the control ability. Therefore, since the technique to adapt or match nonlinear compensation in the nonlinear compensator to actual nonlinear characteristics has long been waited for in the control using a nonlinear compensator, the object of this invention is to provide a plant control system that can adapt or match nonlinear compensation of a nonlinear compensator to actual nonlinear characteristics.

Figure 7:
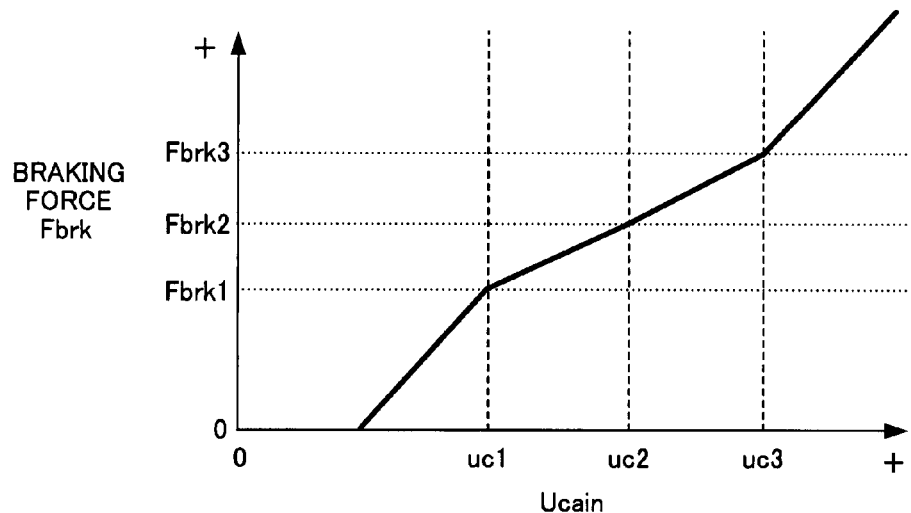
FIG. 7 is a graph showing the characteristics of the braking force Fbrk and voltage inputted to the electromagnet of the electromagnetic brake in the variable phase mechanism (control input; phase command value) Ucain shown in FIG. 3 to FIG. 5.

In the variable phase mechanism 42 shown in FIG. 3 to FIG. 5, the relationship between the braking force Fbrk and voltage inputted to the electromagnet 42b5 (control input; phase command value) Ucain of the electromagnetic brake 42b has nonlinearity like that shown in FIG. 7. Specifically, when the input voltage Ucain is made smaller than a certain value, the braking force Fbrk exhibits sharp decrease relative to the input. On the other hand, when the input voltage is made larger than a certain extent, the braking force shows sharp increase relative to the input.

This is because the amount of electromagnetic force to be generated has linear characteristics relative to the current, i.e., the voltage applied to the electromagnet 42b5, but the electromagnetic force is inversely proportional to the square of distance. Note that although the characteristics should, in fact, be indicated by a continues curve, they are shown by a broken line in FIG. 7.

Here, the controlled object, specifically the plant, i.e., the variable phase mechanism (VTC) 42 is expressed using a linear model mentioned below.

[Numeral 1]

$$\text{Cain}(k+1) = a1sc\,\text{Cain}(k) + a2sc\,\text{Cain}(k-1) + b1sc\,U\text{cain}(k) + b2sc\,U\text{cain}(k-1) \tag{1-1}$$

In the above, $a1sc$, $a2sc$, $b1sc$, $b2sc$ are model parameters scheduled in response to NE and Cain.

An expanded controlled object including a disturbance estimation value c1 is defined as follows.

[Numeral 2]

$$\text{Cain}(k+1) = a1sc\,\text{Cain}(k) + a2sc\,\text{Cain}(k-1) + b1sc\,U\text{cain}(k) + b2sc\,U\text{cain}(k-1) + c1 \quad (1\text{-}2)$$

Figure 8:
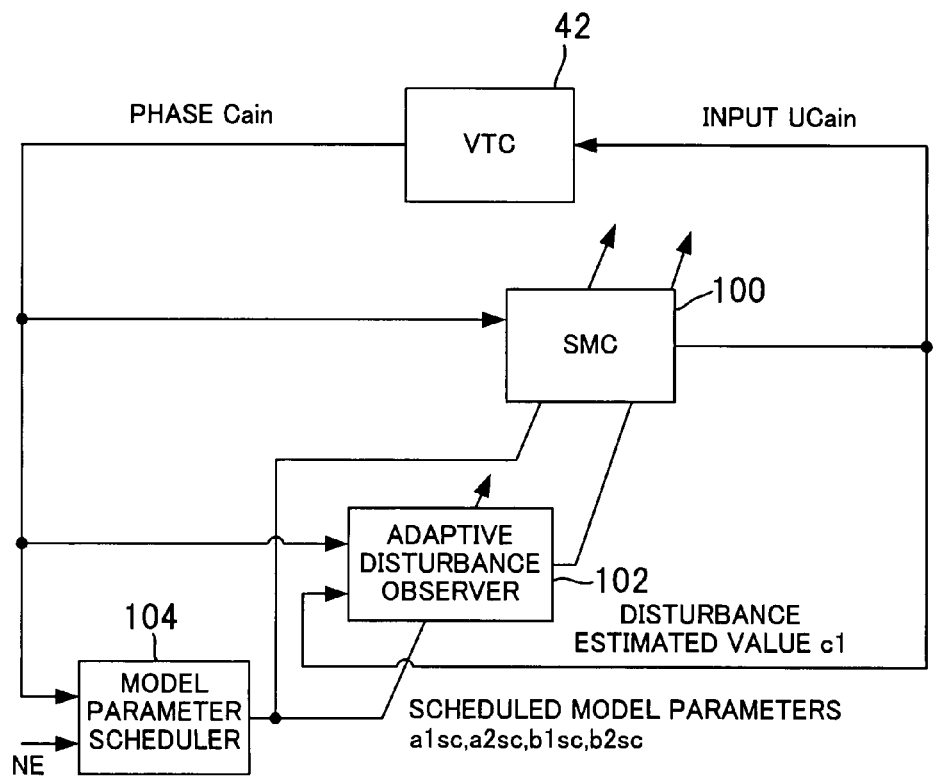
FIG. 8 is a block diagram showing the configuration of a control system obtained by applying a two-degree-of-freedom response-specifying control to the prior art described in Patent Reference 1.

The response-specifying control, specifically sliding mode control, more specifically two-degree-of-freedom response-specifying control, that can respectively specify convergence time and convergence behavior of desired value response and disturbance suppressing response, is realized by the control system shown in FIG. 8 and Eq. 1-3 to Eq. 1-16. The control system shown there is that obtained by applying a two-degree-of-freedom response-specifying control to the prior art described in Patent Reference 1.

As shown in FIG. 8, the two-degree-of-freedom response-specifying control system comprises SMC (Sliding Mode Controller) 100, an adaptive disturbance observer 102 and a model parameter scheduler 104.

The SMC 100 is defined as follows:
[Numeral 3]

$$U\text{cain}(k) = U\text{eq}(k) + U\text{rch}(k) \quad (1\text{-}3)$$

Equivalent Control Input $$U\text{eq}(k) = \frac{1}{b1sc(k)}\{(1 - a1sc(k) - \text{POLE})\,\text{CAIN}(k) + (\text{POLE} - a2sc(k))\,\text{CAIN}(k-1) - b2sc(k)\,U\text{cain}(k-1) - c1(k) + \text{CAIN\_cmd\_}f(k) + (\text{POLE} - 1)\,\text{CAIN\_cmd\_}f(k-1) - \text{POLE}\,\text{CAIN\_cmd\_}f(k-2)\} \quad (1\text{-}4)$$

Reaching Law Input $$U\text{rch}(k) = -\frac{Krch}{b1sc(k)}\sigma(k) \quad (1\text{-}5)$$

Switching Function $$\sigma(k) = E\text{cain}(k) + \text{POLE}\,E\text{cain}(k-1) \quad (1\text{-}6)$$

$$E\text{cain}(k) = \text{CAIN}(k) - \text{CAIN\_cmd\_}f(k-1) \quad (1\text{-}7)$$

Desired Value Filter $$\text{CAIN\_cmd\_}f(k) = -\text{POLE\_}f\,\text{CAIN\_cmd\_}f(k-1) + (1 + \text{POLE\_}f)\,\text{CAIN\_cmd}(k) \quad (1\text{-}8)$$

Krch: Feedback gain
POLE: Switching-function-setting parameter
POLE_f: Desired-value-filter coefficient; Here, $-1 < \text{POLE\_}f < \text{POLE} < 0$ The adaptive disturbance observer 102 is defined as follows:
[Numeral 4]

$$c1(k) = c1(k-1) + \frac{Pdov}{1+Pdov}e\_dov(k) \quad (1\text{-}9)$$

$$e\_dov(k) = \text{CAIN}(k) - \text{CAIN\_hat}(k) \quad (1\text{-}10)$$

$$\text{CAIN\_hat}(k) = \theta^T(k)\zeta(k) \quad (1\text{-}11)$$

$$\theta^T(k) = [a1sc(k)\,a2sc(k)\,b1sc(k)\,b2sc(k)\,c1(k-1)]$$

$$\zeta^T(k) = [\text{CAIN}(k-1)\,\text{CAIN}(k-2)\,U\text{cain}(k-1)\,U\text{cain}(k-2)\,1] \quad (1\text{-}12)$$

Pdov: Identifying gain
a1sc, a2sc, b1sc, b2sc: Scheduled model parameters calculated (MAP-retrieved) in response to NE or Cain The model parameter scheduler 104 is defined as follows:
[Numeral 5]

$$a1sc(k) \leftarrow a1sc\_\text{map}(k) \quad (1\text{-}13)$$

$$a2sc(k) \leftarrow a2sc\_\text{map}(k) \quad (1\text{-}14)$$

$$b1sc(k) \leftarrow b1sc\_\text{map}(k) \times Kbsc(k) \quad (1\text{-}15)$$

$$b2sc(k) \leftarrow b2sc\_\text{map}(k) \times Kbsc(k) \quad (1\text{-}16)$$

Figure 9:
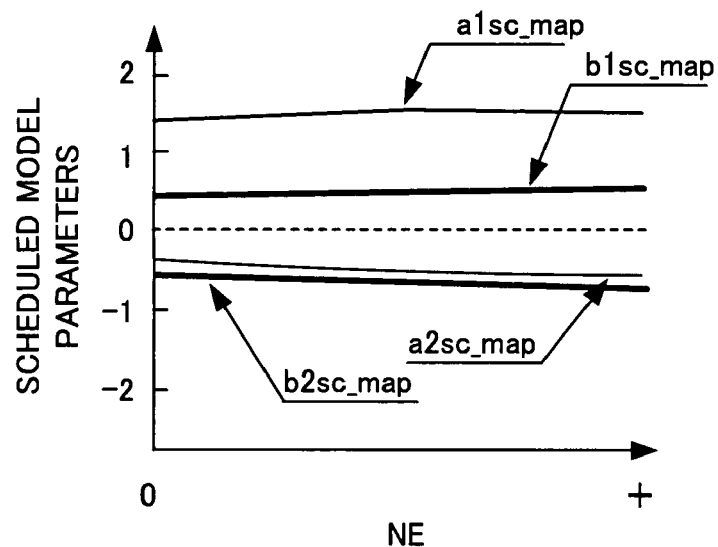
FIG. 9 is a graph showing the characteristics of scheduled model parameters used in the control system shown in FIG. 8.
Figure 10:
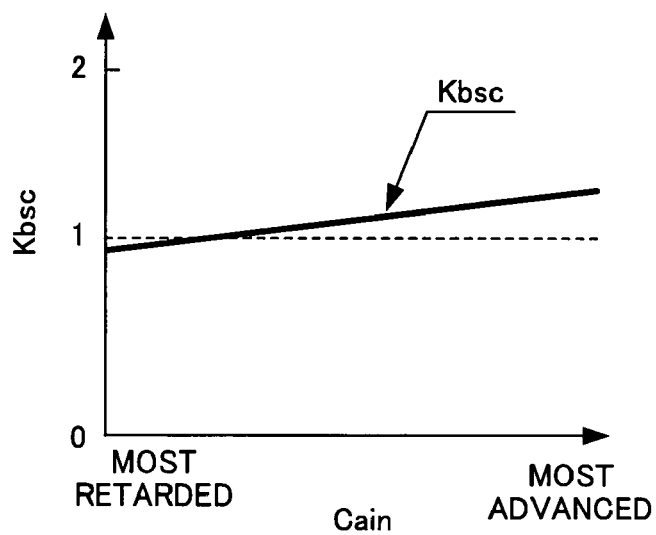
FIG. 10 is a graph showing the characteristics of correction factor of the scheduled model parameters used in the control system shown in FIG. 8.

In the equations mentioned above and below, a1sc_map, a2sc_map, b1sc_map and b2sc_map are (scheduled) model parameters obtained by retrieving characteristics shown in FIG. 9 by a detected engine speed NE. Kbsc is a correction factor of the (scheduled) model parameters obtained by retrieving characteristics shown in FIG. 10 by a detected phase Cain. The suffix k is a discrete system sample time and more specifically, the time at which the flowchart of FIG. 6 is executed.

Figure 11:
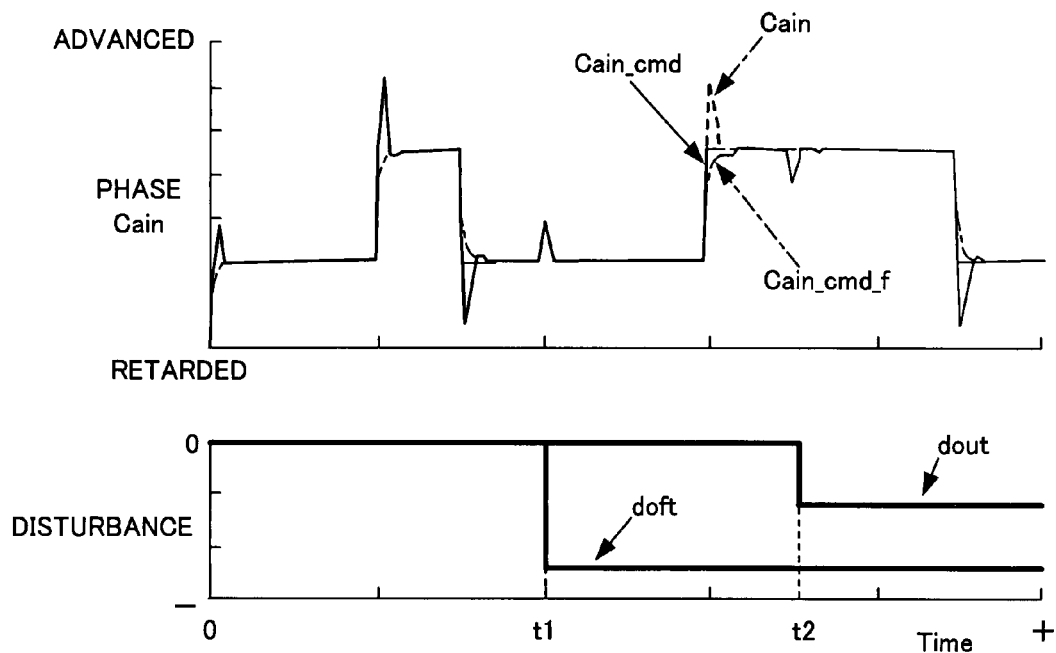
FIG. 11 is a time chart showing results (simulation results) of controlling the variable phase mechanism (VTC) by the control system shown in FIG. 8.
Figure 12:
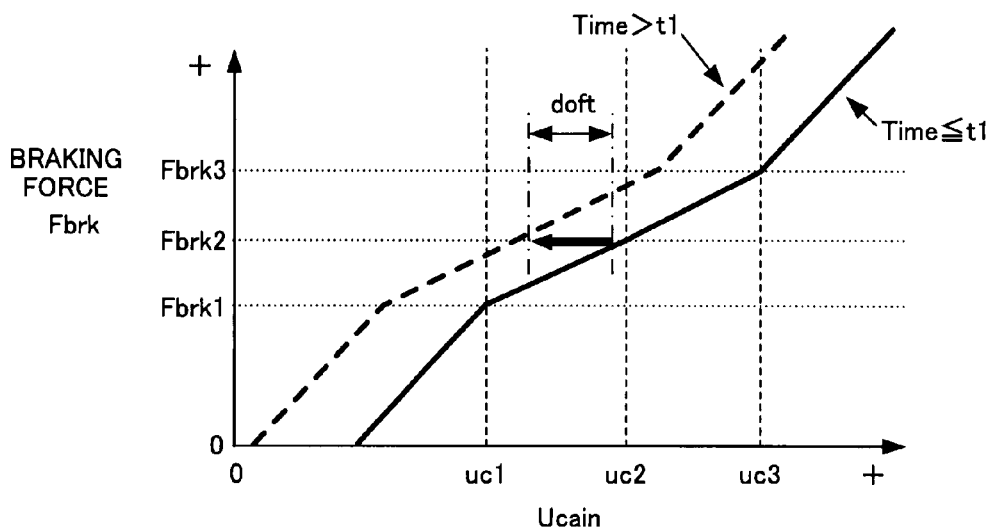
FIG. 12 is a graph showing an offset due to temperature rise of the electromagnet or the like in the characteristics shown in FIG. 7.

FIG. 11 is a time chart that shows results (simulation results) of controlling the variable phase mechanism (VTC) 42 having the nonlinear characteristics by the linear control system shown in FIG. 8. In FIG. 11, a disturbance (external force) dout is applied at time t2. At time t1 preceding thereto, the nonlinear characteristics cause offset to happen due to temperature rise of the electromagnet 42b5 or the like, as shown in FIG. 12.

In the result of control in FIG. 11, since the adaptive disturbance observer 102 can not absorb the modeling error, instantaneously, caused by the controlled object's nonlinearity, overshooting markedly occurs in the follow-up to the desired value markedly. It can be seen from the result that less overshooting that characterizes the two-degree-of-freedom response-specifying control is lost. However, even in this configuration, because the influences by doft, dout can be absorbed by the adaptive disturbance observer 102, there is no steady-state error between the phase Cain and desired value Cain-cmd.

Therefore, in order to design a control system that takes the controlled object's nonlinearity into account, the controlled object is modeled by nonlinear elements and linear elements (lag elements) as follows:
[Numeral 6]

$$\text{Cain}(k+1) = a1sc\,\text{Cain}(k) + a2sc\,\text{Cain}(k-1) + b1sc\,Unl(k) + b2sc\,Unl(k-1) \quad (1\text{-}17)$$

$$Unl(k) = dUnl(k) + Cnl \quad (1\text{-}18)$$

$$dUnl(k) = Gnl(dU\text{cain}'(k)) \quad (1\text{-}19)$$

$$dU\text{cain}'(k) = U\text{cain}(k) - Cnl \quad (1\text{-}20)$$

Figure 13:
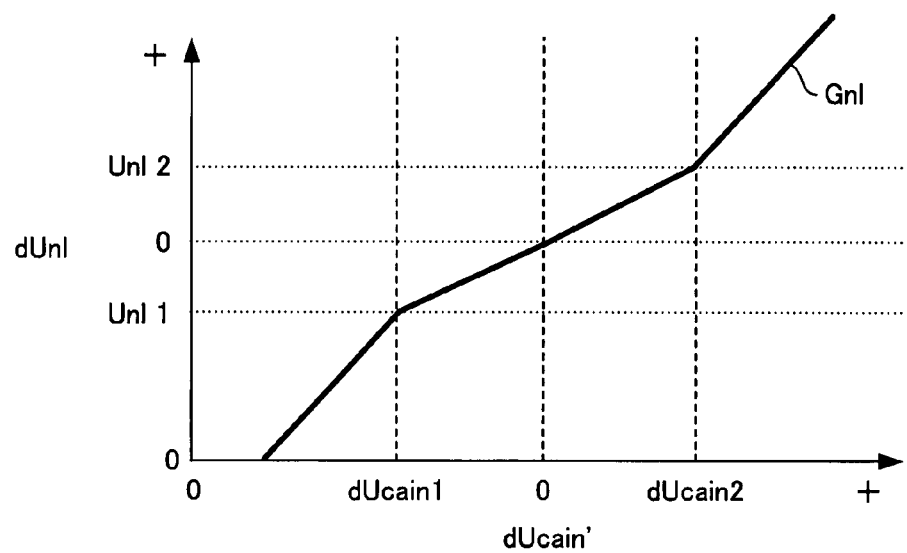
FIG. 13 is a graph showing table characteristics of nonlinear function Gnl to be used to improve the control system shown in FIG. 8.

Gnl shown in Eq. 1-19 is a nonlinear function and is set as table values as shown in FIG. 13. This will be the same in equations mentioned below.

Figure 14:
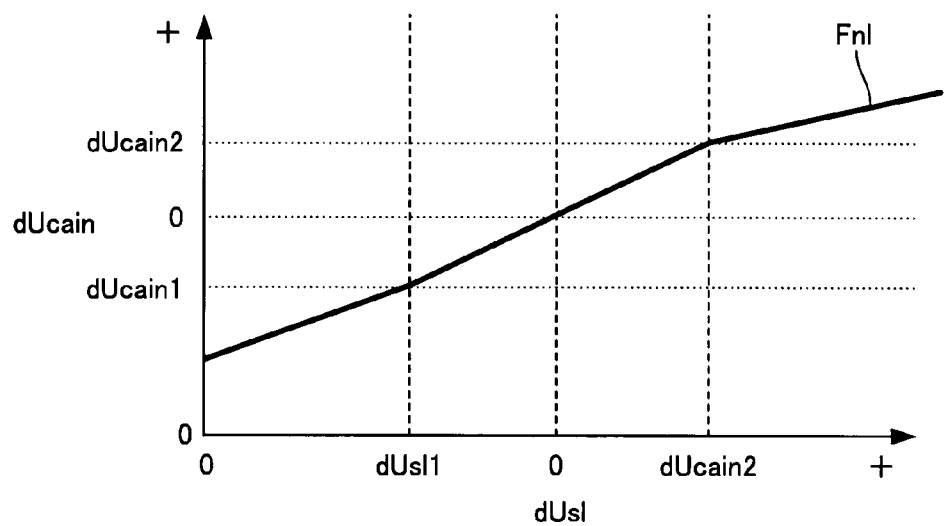
FIG. 14 is a graph showing table characteristics of value Fnl that compensates the characteristics of the nonlinear function shown in FIG. 13 to linearize the same.

Next, the value Fnl that compensates and linearizes the characteristics of nonlinear function shown in FIG. 13 is defined as table values as shown in FIG. 14, and renaming the control input Ucain shown in FIG. 8 as Usl and based on Usl, the control input Ucain is newly calculated as follows:

[Numeral 7]

$$U\text{cain}(k) = dU\text{cain}(k) + Cn1 \quad (1\text{-}21)$$

$$dU\text{cain}(k) = Fnl(dUsl(k)) \quad (1\text{-}22)$$

$$dUsl(k) = Usl(k) - Cn1 \quad (1\text{-}23)$$

Figure 15:
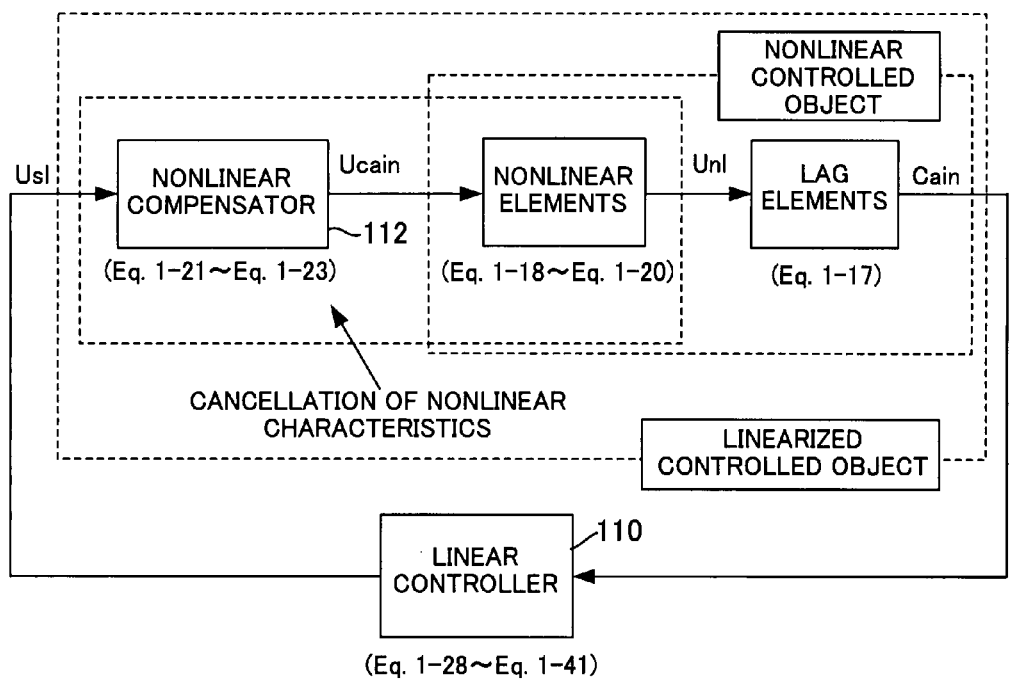
FIG. 15 is a block diagram showing the configuration of a control system obtained by improving the control system shown in FIG. 8.

With this, the relationship between Usl and Unl becomes linear (proportional or equal), and the dynamic characteristics from Usl to Cain can be linearized. FIG. 15 shows a block diagram that illustrates the configuration of the obtained control system.

Accordingly, it suffices if a linear controller 110 (comprising the SMC 100, adaptive disturbance observer 102 and model parameter scheduler 104 in FIG. 8) for calculating the provisional input recognizes the linearized controlled object as shown in the following equation.

[Numeral 8]

$$\text{Cain}(k+1) = a1sc\,\text{Cain}(k) + a2sc\,\text{Cain}(k-1) + b1sc\,Usl(k) + b2sc\,Usl(k-1) \quad (1\text{-}24)$$

Putting equations in order, in the control system shown in FIG. 15, equations for the nonlinear compensator 112 are as follows:

[Numeral 9]

$$U\text{cain}(k) = dU\text{cain}(k) + Cn1 \quad (1\text{-}25)$$

$$dU\text{cain}(k) = Fnl(dUsl(k)) \quad (1\text{-}26)$$

$$dUsl(k) = Usl(k) - Cn1 \quad (1\text{-}27)$$

Equations for the linear controller (two-degree-of-freedom response-specifying controller) 110 are as follows:

[Numeral 10]

$$Usl(k) = Ueq(k) + Urch(k) \quad (1\text{-}28)$$

Equivalent Control Input $$Ueq(k) = \frac{1}{b1sc(k)}\{(1 - a1sc(k) - \text{POLE})\,\text{CAIN}(k) + (\text{POLE} - a2sc(k))\,\text{CAIN}(k-1) - b2sc(k)Usl(k-1) - c1(k) + \text{CAIN\_cmd\_}f(k) + (\text{POLE} - 1)\text{CAIN\_cmd\_}f(k-1) - \text{POLE}\,\text{CAIN\_cmd\_}f(k-2)\} \quad (1\text{-}29)$$

Reaching Law Input $$Urch(k) = -\frac{Krch}{b1sc(k)}\sigma(k) \quad (1\text{-}30)$$

Switching Function $$\sigma(k) = E\text{cain}(k) + \text{POLE}\,E\text{cain}(k-1) \quad (1\text{-}31)$$

$$E\text{cain}(k) = \text{CAIN}(k) - \text{CAIN\_cmd\_}f(k-1) \quad (1\text{-}32)$$

Desired Value Filter $$\text{CAIN\_cmd\_}f(k) = -\text{POLE\_}f\,\text{CAIN\_cmd\_}f(k-1) + (1 + \text{POLE\_}f)\text{CAIN\_cmd}(k) \quad (1\text{-}33)$$

Krch: Feedback gain
POLE: Switching-function-setting parameter
POLE_f: Desired-value-filter coefficient; Here, $-1 < \text{POLE\_}f < \text{POLE} < 0$ Equations for the adaptive disturbance observer 102 (FIG. 8) that constitutes the linear controller 110 are as follows:

[Numeral 11]

$$c1(k) = c1(k-1) + \frac{Pdov}{1 + Pdov}e\_dov(k) \quad (1\text{-}34)$$

$$e\_dov(k) = \text{CAIN}(k) - \text{CAIN\_hat}(k) \quad (1\text{-}35)$$

$$\text{CAIN\_hat}(k) = \theta^T(k)\zeta(k) \quad (1\text{-}36)$$

$$\theta^T(k) = [a1sc(k)\,a2sc(k)\,b1sc(k)\,b2sc(k)\,c1(k-1)]$$

$$\zeta^T(k) = [\text{CAIN}(k-1)\,\text{CAIN}(k-2)\,Usl(k-1)\,Usl(k-2)\,1] \quad (1\text{-}37)$$

Pdov: Identifying gain

Similarly, equations for the model parameter scheduler 104 (FIG. 8) that constitutes the linear controller 110 are as follows:

[Numeral 12]

$$a1sc(k) \leftarrow a1sc\_map(k) \quad (1\text{-}38)$$

$$a2sc(k) \leftarrow a2sc\_map(k) \quad (1\text{-}39)$$

$$b1sc(k) \leftarrow b1sc\_map(k) \times Kbsc(k) \quad (1\text{-}40)$$

$$b2sc(k) \leftarrow b2sc\_map(k) \times Kbsc(k) \quad (1\text{-}41)$$

Figure 16:
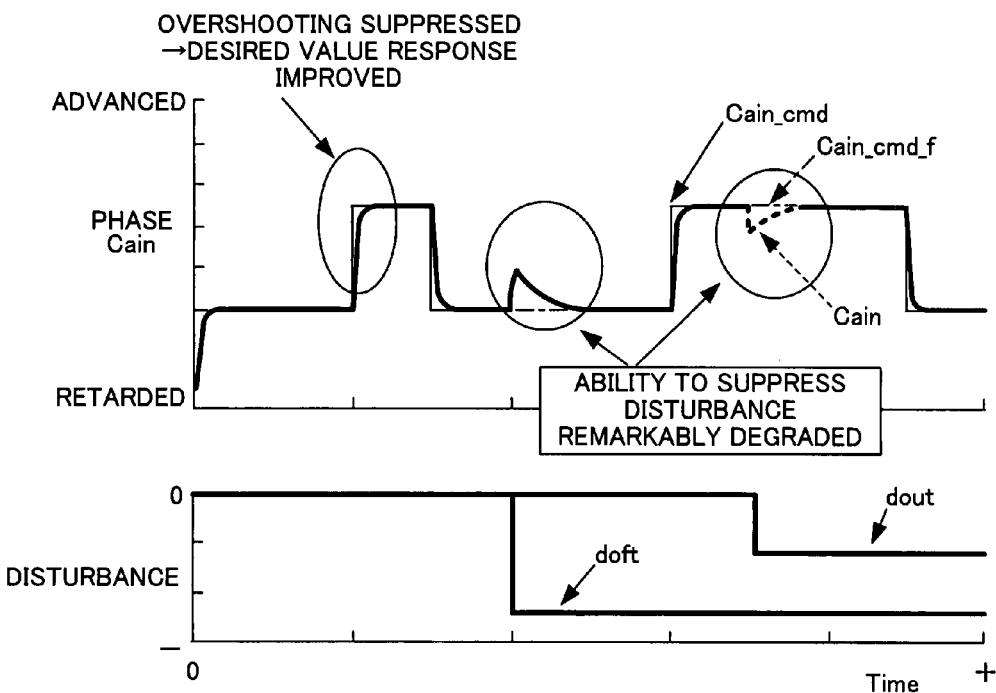
FIG. 16 is a time chart showing results (simulation results) of controlling the variable phase mechanism (VTC) by the control system shown in FIG. 15.

FIG. 16 shows the result of control using the nonlinear compensator 112 illustrated in FIG. 15. As seen from the figure, by inserting the nonlinear compensator 112, the follow-up to the desired value is greatly improved and less overshooting that characterizes the two-degree-of-freedom response-specifying control returns. Rather, as regards suppression of doft, dout that indicates deviations or changes in the nonlinear characteristics, the convergence time periods are elongated.

In view of the above, it has been waited for a technique that can enhance the ability of suppression of doft, dout by improving the technique using the nonlinear compensator 112. The present invention aims to provide a plant control system that solves this problem.

Explaining this, the configuration of the control system shown in FIG. 15 has the function to compensate the nonlinear characteristics of the controlled object, but has no function to compensate change of the nonlinear characteristics of the controlled object (shown in FIG. 12). Accordingly, in the plant control system according to this invention, the configuration shown in FIG. 15 is added with the function to adapt to the change of the nonlinear characteristics of the controlled object.

In the control system shown in FIG. 15, if cancellation of the nonlinear characteristics by the nonlinear compensator 112 is done correctly, the output Cain of the controlled object in response to the control input Ucain and the output Cain-est of a controlled object model expressed by the following equation 2-1 will be equal to each other.

[Numeral 13]

$$\text{Cain\_est}(k) = a1sc\,\text{Cain}(k-1) + a2sc\,\text{Cain}(k-2) + b1sc\,Usl(k-1) + b2sc\,Usl(k-2) \quad (2\text{-}1)$$

On the contrary, if the cancellation of the nonlinear characteristics is not done correctly, since an error is present between the model expressed by the above equation and the static characteristics of the linearized controlled object shown in FIG. 15, an error e_nl is present between Cain and Cain_est represented by the following equation.

[Numeral 14]

$$e\_nl(k)=\text{Cain\_est}(k)-\text{Cain}(k) \quad (2\text{-}2)$$

Paying an attention to it, the plant control system according to the present invention is configured such that the nonlinear compensator 112 is modified as follows to improve Cnl_adp used therein so as to make e_nl to zero, such that the cancellation of the nonlinear characteristics by the nonlinear compensator 112 is carried out correctly.

The improved nonlinear compensator is represented by the following equations.

[Numeral 15]

$$U\text{cain}(k)=dU\text{cain}(k)+Cnl\_adp(k) \quad (2\text{-}3)$$

$$dU\text{cain}(k)=Fnl(dUsl(k)) \quad (2\text{-}4)$$

$$dUsl(k)=Usl(k)-Cnl\_adp(k) \quad (2\text{-}5)$$

In the above (and in the below), Cnl_adp is a nonlinear characteristic correction value.

The nonlinear characteristic correction value in the above equations is calculated by the following equations that use a simplified sliding mode algorithm.

[Numeral 16]

$$Cnl\_adp(k)=Cnl\_\text{base}+Dcnl(k) \quad (2\text{-}6)$$

$$Dcnl(k)=Krch\_cnl\,\sigma cnl(k)+Kadp\_cnl\,\text{sum}\_\sigma cnl(k) \quad (2\text{-}7)$$

$$\sigma cnl(k)=e\_nl(k)+POLE\_cnl\,e\_nl(k-1) \quad (2\text{-}8)$$

In the above, Cnl_base is a basic value of the nonlinear characteristic correction value and is set to Cnl in Eq. 1-25, but may be scheduled by the engine speed NE or some similar parameter.

Figure 17:
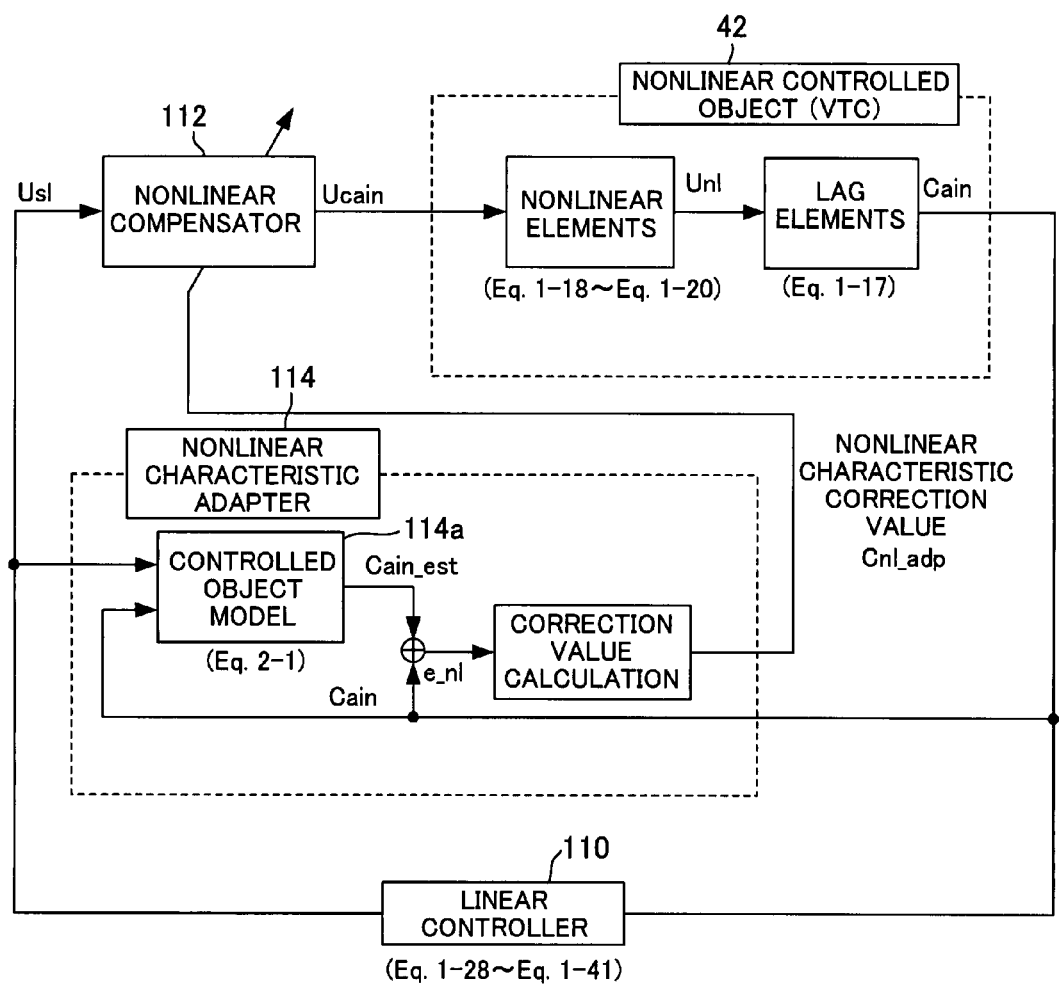
FIG. 17 is a block diagram showing the configuration of a control system obtained by further improving the control system shown in FIG. 15.

To be more specific, as shown in FIG. 17, the plant control system according to the present invention is configured to have a nonlinear characteristic adapter 114 such that Cnl_adp is determined in such a manner that e_nl is made zero and the cancellation of the nonlinear characteristics by the nonlinear compensator 112 is carried out correctly.

Figure 18:
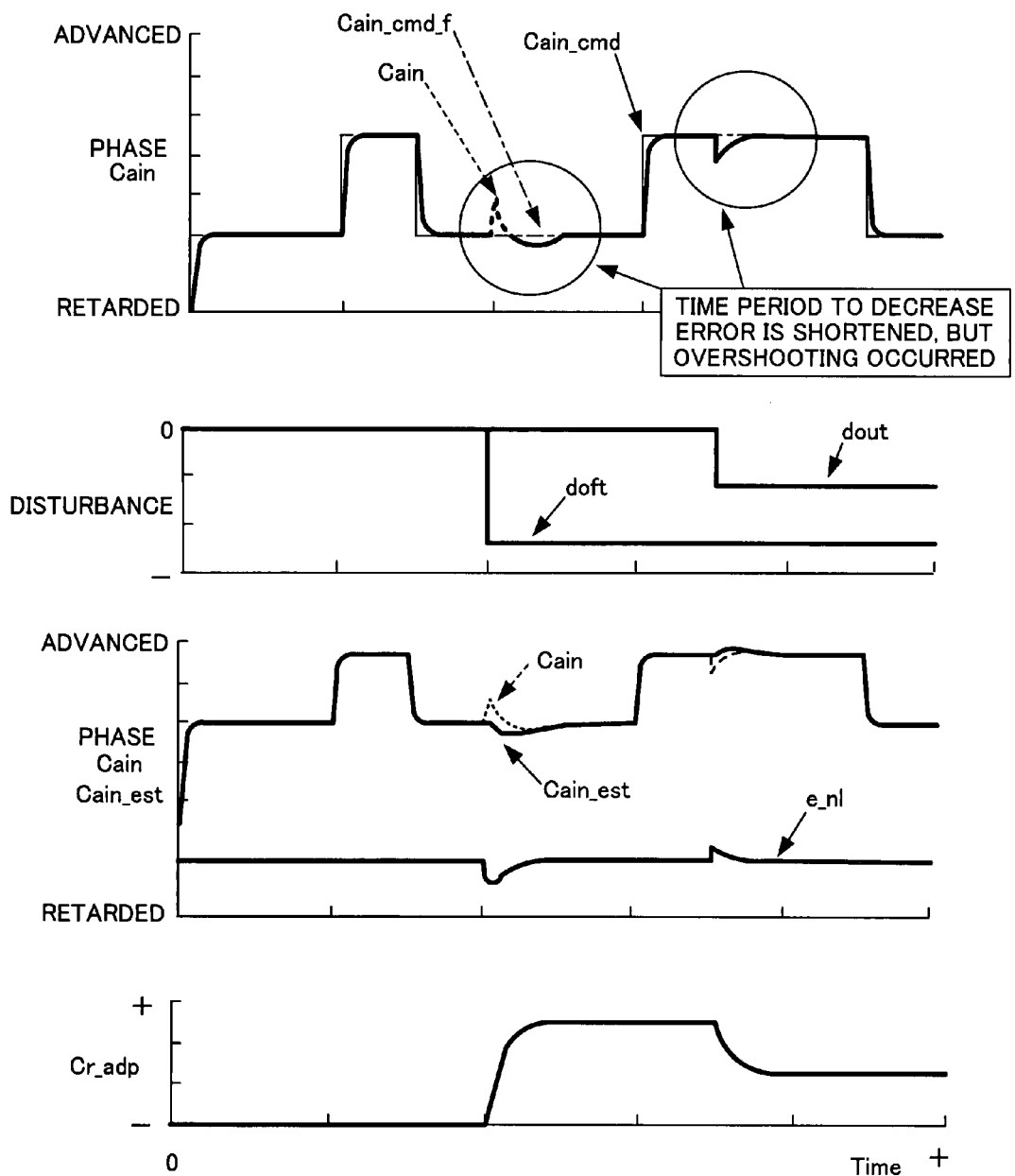
FIG. 18 is a time chart showing results (simulation results) of controlling the variable phase mechanism (VTC) by the control system shown in FIG. 17.

FIG. 18 shows results (simulation results) of the control system shown in FIG. 17. In the results shown in FIG. 18, the time period during which absolute values of the errors produced by doft and dout is decreased, is shortened. However, since overshooting behaviors are still present, further improvement of the control ability is expected.

The reason why overshooting behaviors are present is that the adaptive disturbance observer 102 for compensating the disturbance of the linear controller 110 and the nonlinear characteristic adapter 114 interfere with each other. Specifically, this is because the nonlinear characteristic adapter 114 recognizes e_nl (that is produced by the disturbance dout) as a discrepancy of the nonlinear characteristics and acts to correct Cnl_adp, whereas if an error is present due to the nonlinear characteristic offset doft, the adaptive disturbance observer 102 acts to correct it.

In order to avoid this interference, inputs to the controlled object model 114a used by the nonlinear characteristic adapter 114 are modified as follows:

[Numeral 17]

$$U\text{est}(k)=U\text{eq\_est}(k)+U\text{rch}(k) \quad (2\text{-}9)$$

$$U\text{eq\_est}(k)=\frac{1}{b1sc(k)}\{(1-a1sc(k)-\text{POLE})\,\text{CAIN}(k)+ \quad (2\text{-}10)$$
$$(\text{POLE}-a2sc(k))\,\text{CAIN}(k-1)-b2sc(k)U\text{est}(k-1)+$$
$$\text{CAIN\_cmd\_f}(k)+(\text{POLE}-1)\,\text{CAIN\_cmd\_f}(k-1)-$$
$$\text{POLE CAIN\_cmd\_f}(k-2)\}$$

Compared to Usl, the term of disturbance estimation value c1 estimated by the adaptive disturbance observer 102 is removed from the input Uest. Explaining this, in the output Cain of the actual controlled object, since the influence of the disturbance dout is canceled by the disturbance estimation value c1, the influence is not present in the output Cain. However, since the disturbance dout to be canceled is not present in the controlled object model 114a, the influence of input increase due to the disturbance estimation value c1 can be erroneously present in the model output Cain_est and hence, the error e_nl can be present erroneously.

Accordingly, using Uest, the controlled object model 114a is improved as follows:

[Numeral 18]

$$\text{Cain\_est}(k)=a1sc\,\text{Cain}(k-1)+a2sc\,\text{Cain}(k-2)+b1sc\,U\text{est}(k-1)+b2sc\,U\text{est}(k-2) \quad (2\text{-}11)$$

Explaining the equations of the improved control system, those for the nonlinear compensator 112 are as follows:

[Numeral 19]

$$U\text{cain}(k)=dU\text{cain}(k)+Cnl\_adp(k) \quad (2\text{-}12)$$

$$dU\text{cain}(k)=Fnl(dUsl(k)) \quad (2\text{-}13)$$

$$dUsl(k)=Usl(k)-Cnl\_adp(k) \quad (2\text{-}14)$$

The equations for nonlinear characteristic adapter 114 are as follows:

[Numeral 20]

$$Cnl\_adp(k)=Cnl\_\text{base}+Dcnl(k) \quad (2\text{-}15)$$

$$Dcnl(k)=Krch\_cnl\,\sigma cnl(k)+Kadp\_cnl\,\text{sum}\_\sigma cnl(k) \quad (2\text{-}16)$$

$$\sigma cnl(k)=e\_nl(k)+POLE\_cnl\,e\_nl(k-1) \quad (2\text{-}17)$$

$$e\_nl(k)=\text{Cain\_est}(k)-\text{Cain}(k) \quad (2\text{-}18)$$

$$\text{Cain\_est}(k)=a1sc\,\text{Cain}(k-1)+a2sc\,\text{Cain}(k-2)+b1sc\,U\text{est}(k-1)+b2sc\,U\text{est}(k-2) \quad (2\text{-}19)$$

$$U\text{est}(k)=U\text{eq\_est}(k)+U\text{rch}(k) \quad (2\text{-}20)$$

$$U\text{eq\_est}(k)=\frac{1}{b1sc(k)}\{(1-a1sc(k)-\text{POLE})\,\text{CAIN}(k)+ \quad (2\text{-}21)$$
$$(\text{POLE}-a2sc(k))\,\text{CAIN}(k-1)-b2sc(k)U\text{est}(k-1)+$$
$$\text{CAIN\_cmd\_f}(k)+(\text{POLE}-1)\,\text{CAIN\_cmd\_f}(k-1)-$$
$$\text{POLE CAIN\_cmd\_f}(k-2)\}$$

The equations for the linear controller (two-degree-of-freedom response-specifying controller) 110 are as follows:

[Numeral 21]

$$Usl(k) = Ueq(k) + Urch(k) \quad (2\text{-}22)$$

Equivalent Control Input $$Ueq(k) = \frac{1}{b1sc(k)}\{(1 - a1sc(k) - POLE)\, CAIN(k) + (POLE - a2sc(k)) \quad (2\text{-}23)$$

$$CAIN(k-1) - b2sc(k)Usl(k-1) - c1(k) +$$

$$CAIN\_cmd\_f(k) + (POLE - 1)\, CAIN\_cmd\_f(k-1) -$$

$$POLE\, CAIN\_cmd\_f(k-2)\}$$

Reaching Law Input $$Urch(k) = -\frac{Krch}{b1sc(k)}\sigma(k) \quad (2\text{-}24)$$

Switching Function $$\sigma(k) = Ecain(k) + POLE\, Ecain(k-1) \quad (2\text{-}25)$$

$$Ecain(k) = CAIN(k) - CAIN\_cmd\_f(k-1) \quad (2\text{-}26)$$

Desired Value Filter $$CAIN\_cmd\_f(k) = POLE\_f\, CAIN\_cmd\_f(k-1) + (1 + POLE\_f)CAIN\_cmd(k) \quad (2\text{-}27)$$

Krch: Feedback gain
POLE: Switching-function-setting parameter
POLE_f: Desired-value-filter coefficient; here, $-1 < POLE\_f < POLE < 0$ The equations for the adaptive disturbance observer 102 are as follows:

[Numeral 22]

$$c1(k) = c1(k-1) + \frac{Pdov}{1+Pdov}e\_dov(k) \quad (2\text{-}28)$$

$$e\_dov(k) = CAIN(k) - CAIN\_hat(k) \quad (2\text{-}29)$$

$$CAIN\_hat(k) = \theta^T(k)\zeta(k) \quad (2\text{-}30)$$

$$\theta^T(k) = [a1sc(k)\, a2sc(k)\, b1sc(k)\, b2sc(k)\, c1(k-1)]$$

$$\zeta^T(k) = [CAIN(k-1)\, CAIN(k-2)\, Usl(k-1)\, Usl(k-2)\, 1] \quad (2\text{-}31)$$

The equations for the model parameter scheduler 104 are as follows:

[Numeral 23]

$$a1sc(k) \leftarrow a1sc\_map(k) \quad (2\text{-}32)$$

$$a2sc(k) \leftarrow a2sc\_map(k) \quad (2\text{-}33)$$

$$b1sc(k) \leftarrow b1sc\_map(k) \times Kbsc(k) \quad (2\text{-}34)$$

$$b2sc(k) \leftarrow b2sc\_map(k) \times Kbsc(k) \quad (2\text{-}35)$$

Figure 19:
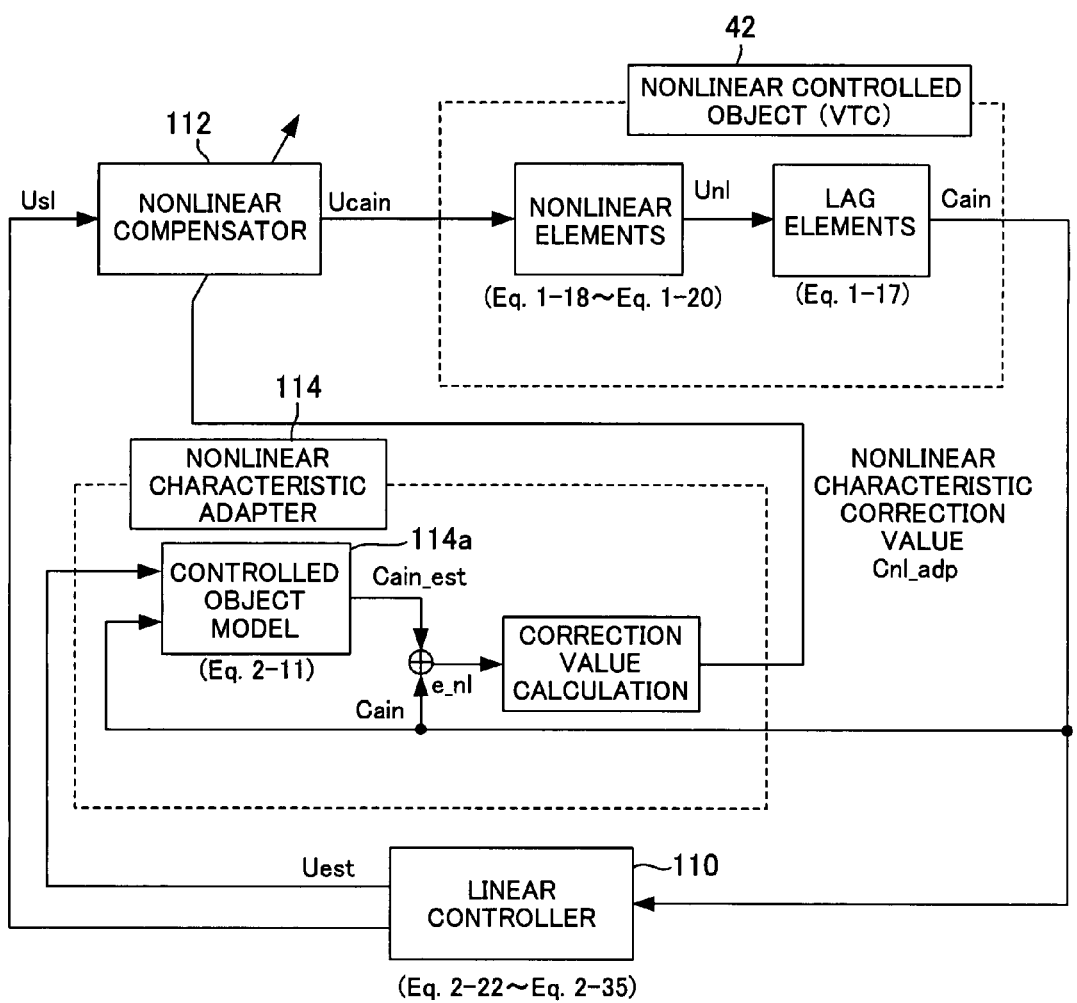
FIG. 19 is a block diagram showing the configuration of a control system obtained by still further improving the control system shown in FIG. 17.
Figure 20:
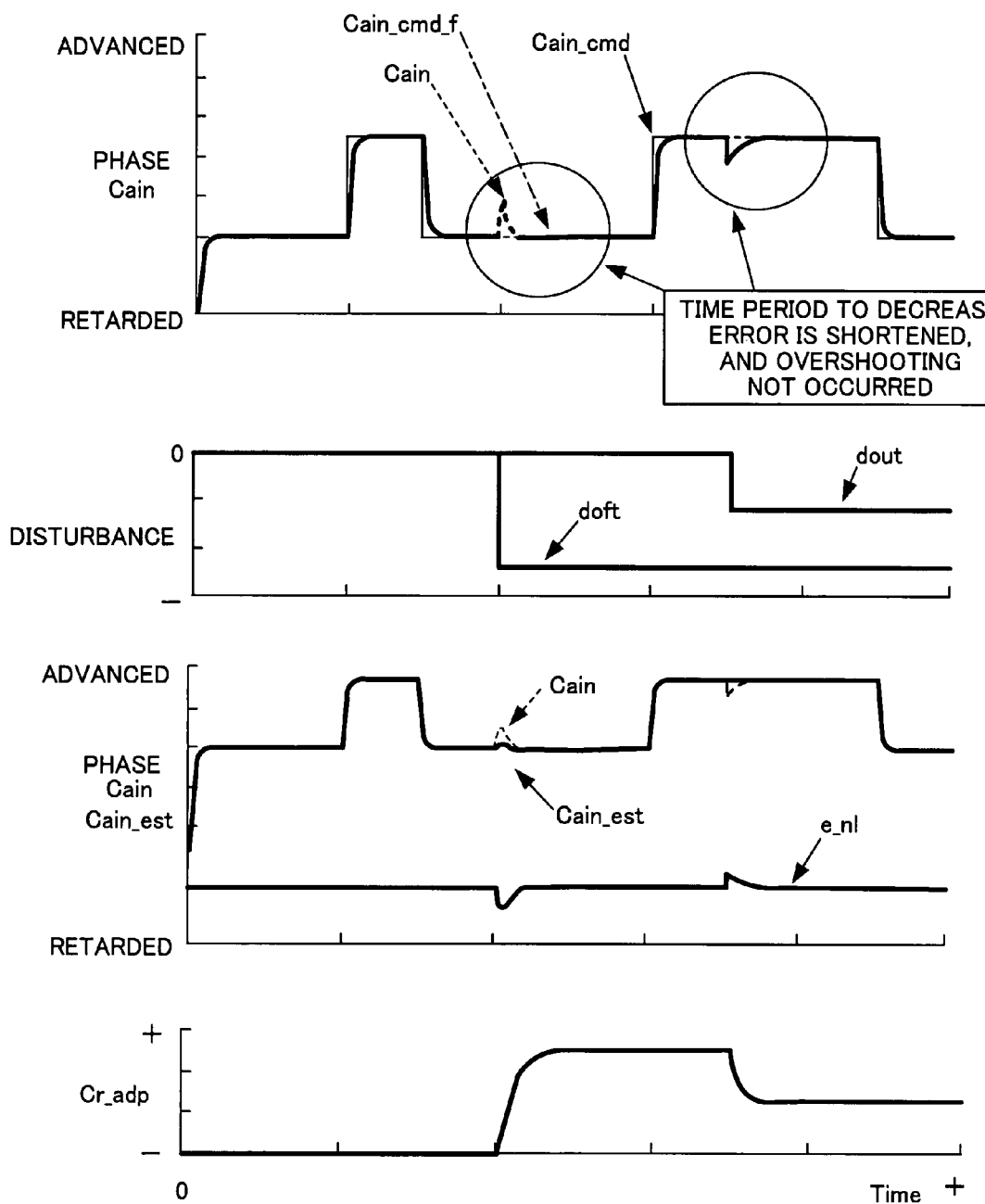
FIG. 20 is a time chart showing results (simulation results) of controlling the variable phase mechanism (VTC) by the control system shown in FIG. 19.

FIG. 19 is a block diagram showing the configuration of the control system using the improved nonlinear characteristic adapter 114. FIG. 20 shows the results of control (simulation results) when the control system shown in FIG. 19 is used. As can be understood from FIG. 20, in the control system shown in FIG. 19, the interference between the nonlinear characteristic adapter 114 and adaptive disturbance observer 102 has been solved (decreased). The system can immediately decrease errors caused by doft or dout, without inviting overshooting. As a matter of course, the less overshooting that is a characterizing feature of the two-degrees-of-freedom response-specifying control is maintained.

On the assumption mentioned above, turning to the explanation of the flowchart of FIG. 6, in S10, as explained, the variable lift mechanism 40, variable phase mechanism 42 and variable compression ratio mechanism 44 are controlled based on the operating state of the engine 10 detected from the sensor outputs, and the intake air quantity of the engine 10 is controlled from the detected operating state.

Figure 21:
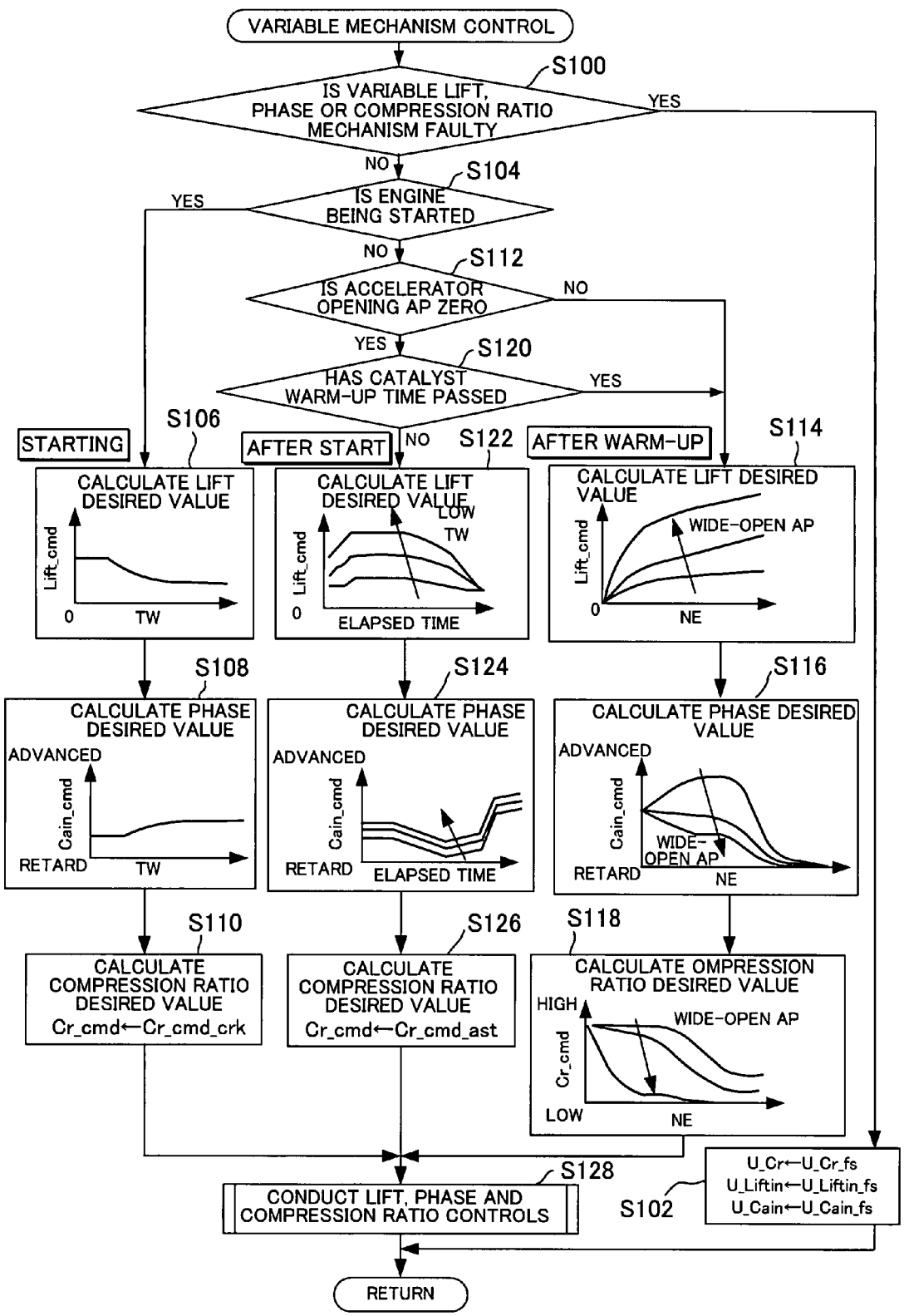
FIG. 21 is a subroutine flowchart showing the processing of variable mechanism control referred to in the flowchart of FIG. 6.

FIG. 21 is a subroutine flowchart showing the processing for the control.

Explaining this, in S100, it is determined whether any of three mechanisms comprising the variable lift mechanism 40, variable phase mechanism 42 and variable compression ratio mechanism 44, is faulty. When the result is affirmative, the program proceeds to S102, in which the command value U_Cr to be supplied to the variable compression ratio mechanism 44 is set at a fail command value U_Cr_fs for establishing the final compression ratio, the command value U_Liftin to be supplied to the variable lift mechanism 40 is set to a fail command value U_Liftin_fs of a level enabling vehicle creep, and the command value U_Cain to be supplied to the variable phase mechanism 42 is set at a fail command value U_Cain_fs that puts the phase on the retarded direction (specifically 0 (supply current zero)).

When the result in S100 is negative, the program proceeds to S104, in which it is determined whether the engine 10 is being started. This is determined by checking whether the detected engine speed NE is below the full-firing engine speed.

When the result in S104 is affirmative, the program proceeds to S106, in which the lift desired value Lift_cmd is calculated by retrieving the characteristics shown using the detected coolant temperature TW such that it increases with increasing friction, to S108, in which the phase desired value Cain_cmd is calculated by retrieving the characteristics shown using the detected coolant temperature TW such that the combustion becomes stable. The program then proceeds to S110, in which the compression ratio desired value Cr_cmd is set to a fixed value Cr_cmd_crk defined such that the engine speed NE at cranking is increased and the unburned HC component is reduced.

When the result in S104 is negative, the program proceeds to S112, in which it is determined whether the detected accelerator opening AP is zero, i.e., whether the accelerator pedal is released. When the result in S112 is negative, which can be taken to mean that the operator wants driving power, the program proceeds to S114, in which the lift desired value Lift_cmd is calculated by retrieving the characteristics shown using the detected engine speed NE and accelerator opening AP, to S116, in which the phase desired value Cain_cmd is calculated by retrieving the characteristics shown using the detected engine speed NE and accelerator opening AP. The program then proceeds to S118, in which the compression ratio desired value Cr_cmd is calculated by retrieving the characteristics shown using the detected engine speed NE and accelerator opening AP.

When the result in S112 is affirmative, which can be taken to mean that the engine 10 is idling, the program proceeds to S120, in which it is determined whether the warm-up time period of the catalytic converter 36 has elapsed. When the result in S120 is affirmative, the program proceeds to S114 and on. When the result in S120 is negative, the program proceeds to S122, in which, in order to warm up the catalytic converter 36 faster, the lift desired value Lift_cmd is calculated by retrieving the characteristics shown using the elapsed time since engine starting and the detected coolant temperature TW. Then the program proceeds to S124, in which the phase desired value Cain_cmd is calculated by retrieving the characteristics shown using the elapsed time since engine starting and detected coolant temperature TW such that the pumping loss is increased and the intake air quantity is increased to promote the warm-up of the catalytic converter 36.

The program then proceeds to S126, in which the compression ratio desired value Cr_cmd is set to a fixed value Cr_c-md_ast defined such that the exhaust gas temperature is raised by lowering the heat efficiency owing to reduced compression ratio. Since execution of the subroutine shown is commenced with starting of the engine 10 and is thereafter executed every 10 milliseconds, the time elapsed from engine starting can therefore be determined from the number of subroutine loops executed.

The program then proceeds to S128, in which the phase control, lift control and compression ratio control are conducted. Specifically, based on the desired values thus determined, the variable compression ratio mechanism 44, variable lift mechanism 40 and variable phase mechanism 42 are controlled.

Figure 22:
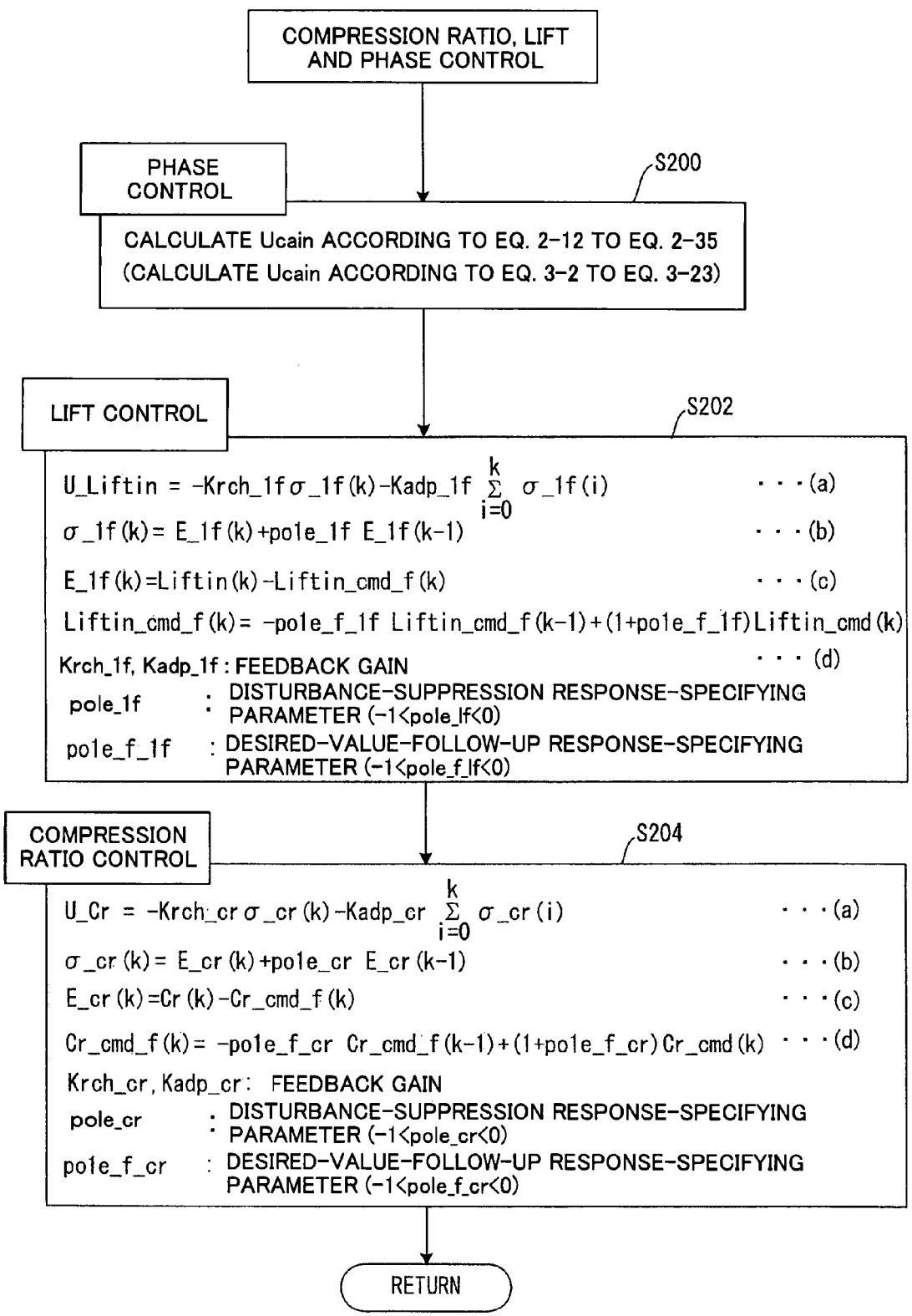
FIG. 22 is a subroutine flowchart showing the processing of the phase controls, etc., referred to in the flowchart of FIG. 21.

FIG. 22 is a subroutine flowchart showing the processing for the control.

Explaining this, in S200, the phase command value (control input) Ucain is calculated by aforesaid Eq. 2-12 to Eq. 2-35, as illustrated.

Outlining this with reference to FIG. 19, the nonlinear compensator 112 calculates the control input Ucain(k) using Eq. 2-12 to Eq. 2-14. The nonlinear characteristic correction value Cnl_adp in the equations is calculated by the nonlinear characteristic adapter 114 by using Eq. 2-15 to Eq. 2-21.

The linear controller (two-degrees-of-freedom response-specifying controller) 110 calculates a provisional input Usl that converges the output Cain of the variable phase mechanism (VTC) 42 (which is the controlled object) to the phase desired value Cain_cmd, in accordance with the response-specifying control algorithm (more specifically, two-degree-of-freedom response-specifying control algorithm) represented by Eq. 2-22 to Eq. 2-27. It should be noted that the sliding mode control is a response-specifying control that can specify the convergence speed of the controlled variable. The two-degree-of-freedom sliding mode control is a development of the sliding model control and is a control that can specify the follow-up speed of the controlled variable to the desired value and the convergence speed of the controlled variable when disturbance is applied, respectively and separately.

To be more specific, in this two-degree-of-freedom response-specifying control algorithm, first, in accordance with the first-order lag filter algorithm represented by Eq. 2-27, a filtered value (desired filter) of the phase desired value Cain_cmd_f(k) is calculated. In the equation, POLE_f is desired value filter factor and POLE referred to in Eq. 2-23, etc., switching function setting parameter, and they are set to be within a range of −1 to 0 as shown at the end of Eq. 2-27.

Then, in accordance with the sliding mode control algorithm represented by Eq. 2-22 to Eq. 2-26, the provisional input Usl(k) is calculated. Specifically, the provisional input Usl(k) is calculated as the sum of equivalent control input Ueq(k) and reaching law input Urch(k).

The equivalent control input Ueq(k) is calculated in accordance with Eq. 2-23. In the equation, c1 is the disturbance estimation value to compensate the disturbance and modeling error, as mentioned above.

The reaching law input Urch(k) is a value that places the state on the switching line and is calculated according to Eq. 2-24. In the equation, Krch is predetermined reaching law gain (feedback gain) and $\sigma(k)$ a switching function as defined by Eq. 2-25. Ecain(k) in Eq. 2-25 represents a follow-up error calculated by Eq. 2-26.

These Eq. 2-22 to Eq. 2-27 are derived in the manner mentioned below. Specifically, first, defining a system whose input is the provisional input Usl(k) and whose output is the phase Cain_est and modeling it as a discrete system model, Eq. 2-11 mentioned above can be obtained. Eq. 2-11 corresponds to a definition of the dynamic characteristics between the provisional input Usl(k) and phase Cain.

Next, replacing the model parameters and disturbance estimation value in Eq. 2-11 with values calculated by the model parameter scheduler 104, assuming a model having the replaced values and applying the desired-filter-type two-degree-of-freedom sliding mode control theory such that the phase Cain follows up the phase desired value Cain_cmd based on the assumed model, Eq. 2-22 to Eq. 2-27 are obtained.

By virtue of the control algorithm of the above-mentioned two-degree-of-freedom response-specifying sliding mode controller (linear controller 110), the phase Cain can follow up the phase desired value Cain_cmd with high accuracy, while suppressing disturbance. Specifically, the follow-up ability can be specified freely by arbitrary setting the desired filter factor POLE_f in Eq. 2-27 within the aforesaid range.

Further, in the control algorithm represented by Eq. 2-22 to Eq. 2-26, the affection of the disturbance and modeling error can be suppressed by the disturbance estimation value. In addition, by arbitrary setting the switching-function-setting parameter within the aforesaid range, the follow-up behavior and the disturbance suppression ability can be specified freely.

In the flowchart of FIG. 22, next in S202, the lift control is conducted in accordance with equations mentioned there.

In the lift control in S202 and compression ratio control in S204, instead of the aforesaid two-degree-of-freedom sliding mode control, its simplified version is used. In the lift control in S202 and compression ratio control in S204, command values are calculated so as to avoid interference between the piston 26 and the intake valves 20 that could occur due to overshooting relative to the desired values.

Explaining this, first in S202, the lift command value (manipulated variable) U_Liftin is calculated in accordance with Eqs. (a) to (d) mentioned there.

In the simplified two-degree-of-freedom sliding mode control, as shown in Eq. (d), using a desired-value-follow-up-response-specifying parameter pole_f_lf and in accordance with the first-order lag filter algorithm, the filtered value of the lift desired value Liftin_cmd_f(k) is calculated. The desired-value-follow-up-response-specifying parameter pole_f_lf is the same as the aforesaid desired-value-filter factor. It defines the follow-up speed of the controlled variable toward the desired value and as shown, is set to a value greater than −1, but smaller than 0.

Next, as shown in Eq. (c), an error E_lf(k) is calculated by subtracting the filtered value of the lift desired value Liftin_c-md_f(k) from a lift detection value Liftin(k). Then, as shown in Eq. (b), the switching function $\sigma\_lk(k)$ is calculated by multiplying the preceding value of the error by the disturbance-suppression-response-specifying parameter pole_f and by adding the product to the current value of error. The disturbance-suppression-response-specifying parameter pole_f is the same as the switching-function-setting parameter and defines the convergence speed of the error E_lf when the disturbance is applied. As shown, it is set to a value greater than −1, but smaller than 0.

Then, as shown in Eq. (a), the lift command value (manipulated variable) U_Liftin is calculated by subtracting the product obtained by multiplying the switching function σ_lf(k)'s integral by the second feedback gain Kadp_lf, from the product obtained by multiplying the switching function σ_lf(k) by the first feedback gain Krch_lf's minus value.

In Eq. (a), the right first term represents the aforesaid reaching law input and is calculated as a proportional term of the switching function as illustrated. The right second term represents the adaptive law input that places the state on the switching line, while suppressing steady-state error, and is calculated as an integral term of the switching function as illustrated. The first and second feedback gains are values set through simulation and experimentation.

At the same time, the lift control is conducted by operating the electric motor 40d of the variable lift mechanism 40 based on the calculated lift command value.

Next in S204, the compression ratio command value (manipulated variable) U_Cr is calculated in accordance with Eq. (a) to Eq. (d) shown there, and the compression ratio control is conducted by operating the hydraulic mechanism 44e of the variable compression ratio mechanism 44 based on the calculated compression ratio command value.

Since the command value calculation itself in S204 is the same as that in S202 except for the difference in suffix, explanation will be omitted.

Turning to the explanation of the flowchart of FIG. 6, next in S12, the fuel control is conducted.

Specifically, this is done by sampling the output of the airflow meter 68 at every CRK signal to calculate the intake air quantity Gcyl_afm therefrom (in order to eliminate the effect of pulsation, using the value averaged over the TDC interval). Then the fuel injection quantity that achieves stoichiometric air/fuel ratio is calculated by retrieving predetermined characteristics by using the calculated intake air quantity Gcyl_afm and the detected accelerator opening AP. The injector 16 is driven based on the calculated fuel injection quantity.

Next in S14, the ignition timing control is conducted.

Figure 23:
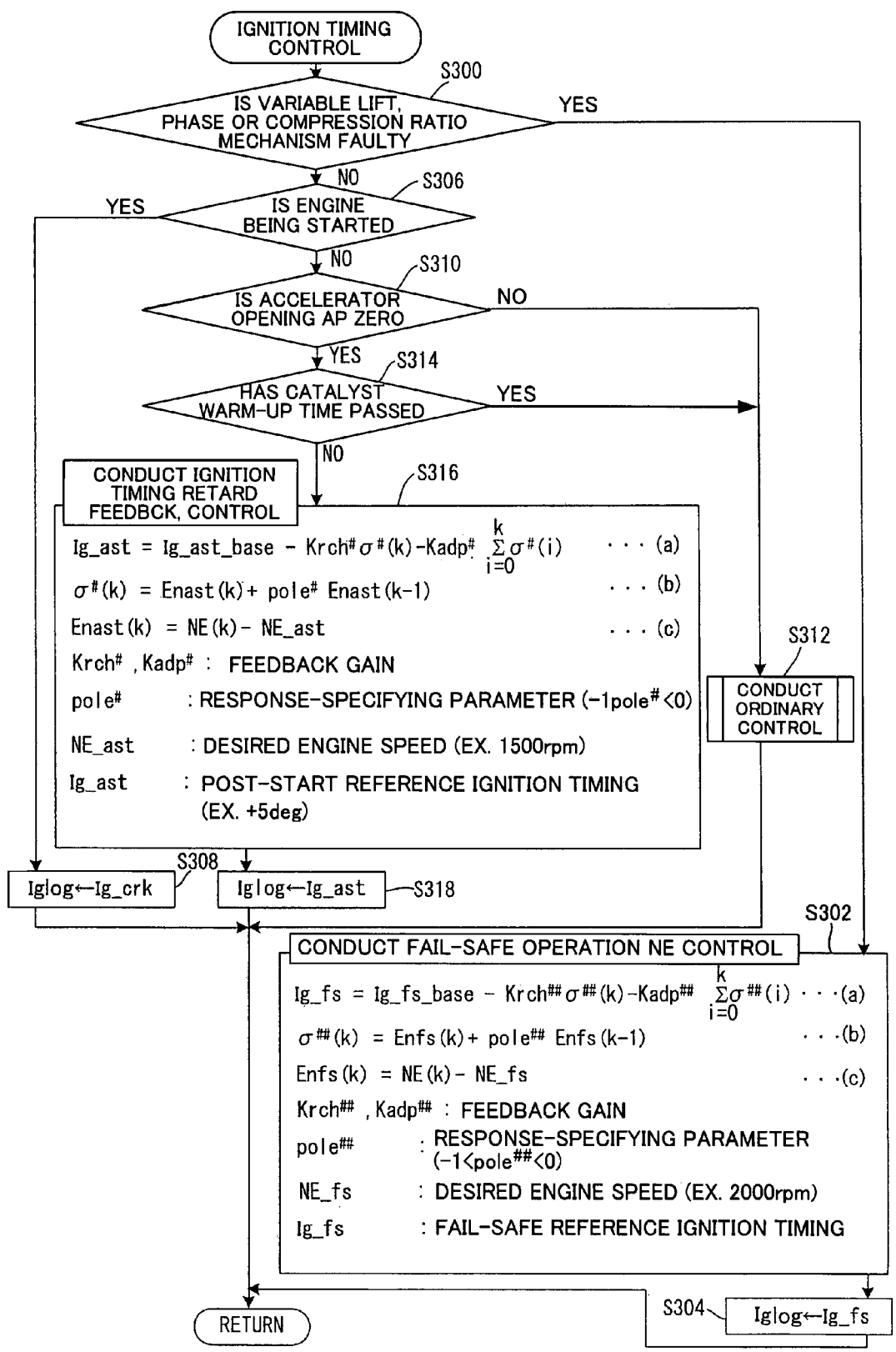
FIG. 23 is a subroutine flowchart showing the processing of ignition timing control referred to in the flowchart of FIG. 6.

FIG. 23 is a subroutine flowchart similar to that of FIG. 21 showing the processing for this control.

Explaining this, In S300, it is similarly determined whether at least any mechanism among the variable lift mechanism 40 and other two mechanisms is faulty. When the result is affirmative, the program proceeds to S302, in which fail-safe operation NE control is conducted in accordance with simplified one-degree-of-freedom sliding mode control, similarly to what has been explained with respect to FIG. 21.

Since torque control of the valve mechanisms is impossible during fail-safe operation, the processing of S302 is for controlling the torque by determining the ignition timing so as to maintain the engine speed NE constant.

Explaining this, first, as indicated by Eq. (c), an error Enfs(k) is calculated by subtracting the desired engine speed NE_fs (e.g., 2,000 rpm) from the engine speed detected value NE(k) and then, as indicated by Eq. (b), the product obtained by multiplying the value of the error in the last or preceding cycle by response-specifying parameter pole### is added to the value of the error in the current cycle to calculate switching function σ##(k).

Next, as indicated by Equation (a), the product obtained by multiplying the integral of the switching function by second feedback gain Kadp# and the product obtained by multiplying the switching function σ##(k) by first feedback gain Krch## are subtracted from the base value lg_fs_base of fail-safe reference ignition timing lg_fs to calculate the fail-safe reference ignition timing lg_fs.

Next, in S304, the calculated fail-safe reference ignition timing is defined as an ignition command value Iglog.

On the other hand, when the result in S300 is negative, the program proceeds to S306, in which it is determined whether the engine 10 is being started. When the result is affirmative, the program proceeds to S308, in which the ignition command value Iglog is set to ignition timing at cranking lg_crk.

When the result in S306 is negative, the program proceeds to S310, in which it is determined whether the detected accelerator opening AP is zero. When the result is negative, which can be taken to mean that the operator wants driving power, the program proceeds to S312, in which ordinary control is conducted. Specifically, the ignition command value Iglog is calculated by retrieving appropriate characteristics (not shown) from the detected engine speed NE and calculated intake air quantity Gcyl_afm.

When the result in S30 is affirmative, the program proceeds to S314, in which it is determined whether the warm-up time period of the catalytic converter 36 has elapsed. When the result is affirmative, the program proceeds to S312, and when it is negative, the program proceeds to S316, in which, by processing similarly to that in S302, feedback control of the ignition timing is conducted in accordance with simplified sliding mode control.

Specifically, as indicated by Eq. (c), an error Enast(k) is calculated by subtracting the desired engine speed NE_ast (e.g., 1,500 rpm) from the engine speed detected value NE(k) and then, as indicated by Eq. (b), the product obtained by multiplying the value of the error in the preceding cycle by response-specifying parameter pole# is added to the value of the error in the current cycle to calculate switching function σ#(k).

Next, as indicated by Equation (a), the product obtained by multiplying the integral of the switching function by second feedback gain Kadp# and the product obtained by multiplying the switching function σ#(k) by first feedback gain Krch# are subtracted from the base value lg_ast_base of post-start reference ignition timing lg_ast to calculate the post-start reference ignition timing lg_ast (e.g., 5 degrees). The program then proceeds to 5318, in which the ignition timing Iglog is set to the calculated post-start reference ignition timing.

As mentioned above, this embodiment provides a system for controlling the variable phase mechanism (plant) 42 of the engine 10 having the linear element and nonlinear element, and calculating control input Ucain based on the linear controller 110 that calculates a provisional input Usl to converge an output of the plant Cain to the phase desired value (desired value) Cain_cmd in accordance with response-specifying control algorithm (more specifically, two-degree-of-freedom response-specifying sliding mode control algorithm) based on the linear element, and on the nonlinear compensator (table characteristics of FIG. 14) 112 set to cancel the provisional input and characteristics of the nonlinear element of the plant; characterized by: the nonlinear characteristic adapter (correcting means) 114 for correcting the nonlinear compensator 112 based on an error e_nl between an output estimated value Cain_est of the plant calculated by an estimation model (estimated model; Eq. 2-1, Eq. 2-11, Eq. 3-1) 114a solely comprising the linear element and the output Cain of the plant. It should be noted that the linear controller 110, etc., are, in fact, processing conducted by the ECU 80.

With this, even when the nonlinear characteristics of the variable phase mechanism (plant) 42 change due to manufacturing variance or aging degradation, it becomes possible to accurately compensate the nonlinear characteristics by the nonlinear compensator 112, and to control the plant output Cain to its desired value Cain_cmd with high accuracy and high response.

Further, since the nonlinear characteristic adapter (correcting means) 114 corrects the nonlinear compensator 112 in accordance with response-specifying control algorithm such that the error e_nl between the output estimated value Cain_est and the output Cain becomes zero, in addition to the effects mentioned above, it becomes possible to improve the control ability, since it becomes possible to make the correction of the nonlinear compensator 112 immediately without causing overshooting to occur.

Further, since the system further includes: means (linear controller 110, more specifically the adaptive disturbance observer 102 that constitutes it) for calculating a disturbance estimated value c1 applied to the variable phase mechanism (plant) 42; and the nonlinear characteristic adapter (correcting means) 114 calculates the output estimated value Cain_est based on a value Uest obtained by subtracting a term (value obtained by eliminating the term) concerning the disturbance estimated value c1 from the control input Ucain (according to Eq. 2-19), in addition to the effects mentioned above, it becomes possible to prevent the plant output Cain from exhibiting overshooting relative to the desired value Cain_cmd and to further improve the control ability, since the disturbance compensation by the disturbance estimated value c1 by the adaptive disturbance observer 102 and correction by the nonlinear characteristic adapter 114 do not interfere with each other.

Further, since the plant is the variable phase mechanism 42 that variably regulates a phase of an intake valve 20 of the engine 10, in addition to the effects mentioned above, it becomes possible to control the phase of the intake valve to a desired phase with high accuracy and high response, without causing overshooting to occur.

Second Embodiment

Figure 24:
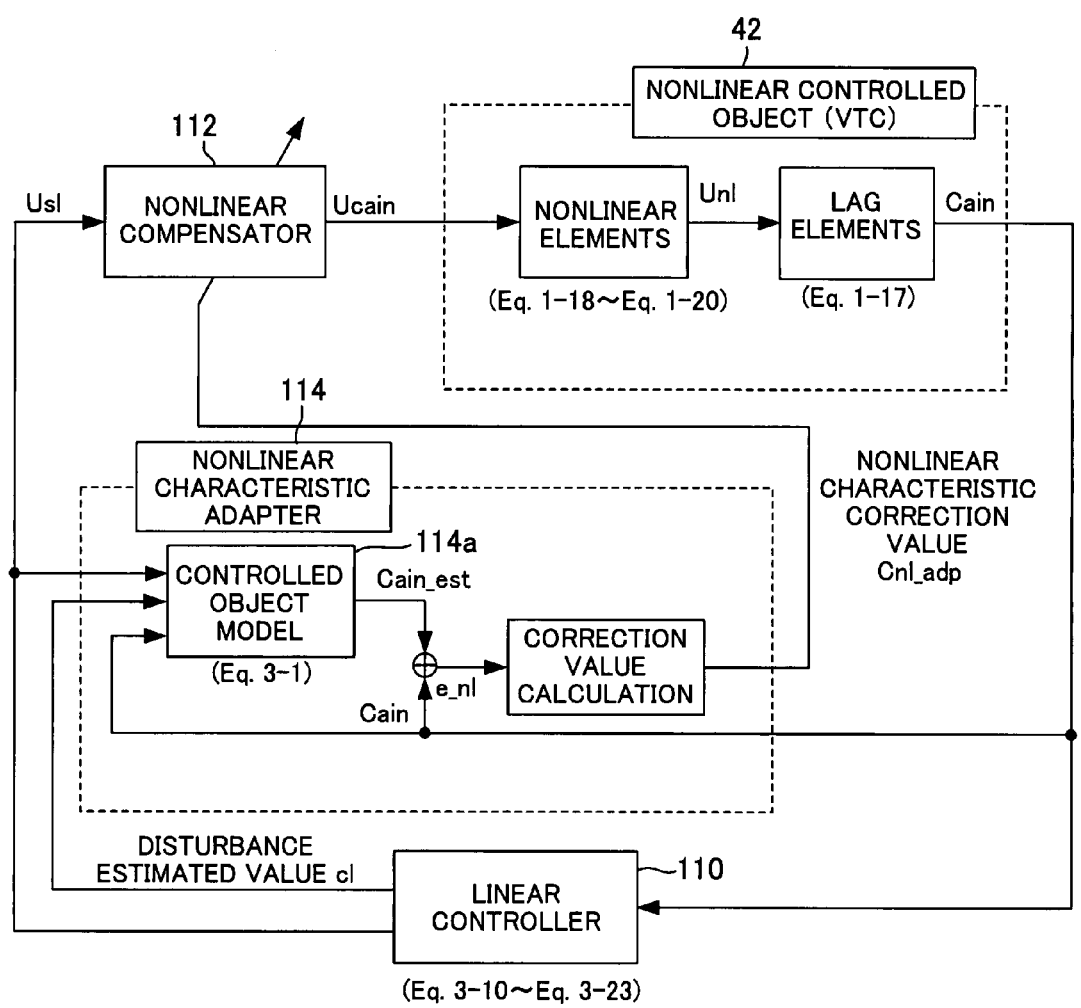
FIG. 24 is a schematic diagram showing the overall structure of a plant control system according to a second embodiment of this invention.

FIG. 24 is a schematic diagram, similar to FIG. 19, but showing the overall structure of a plant control system according to the second embodiment of the invention.

In the control system of the first embodiment, in order to prevent the output Cain_est of the controlled object model 114a in the nonlinear characteristic adapter 114 from being influenced by the input based on the disturbance estimated value c1 to erroneously generate the error e_nl, the system countermeasures to eliminate the terms concerning the disturbance estimated value c1 from the input to the controlled object model 114a. This countermeasure is to solve the discrepancy that the actual controlled object model is applied with disturbance, but the controlled object model 114a is not supplied with disturbance.

Paying an attention on this, as shown in FIG. 24, it can be understood that the same effect can be realized if the controlled object model 114a of the nonlinear characteristic adapter 114 is applied with estimated disturbance that are equivalent to actual disturbance. In other words, using the disturbance estimated value c1 estimated by the adaptive disturbance observer 102, the controlled object model 114a of the nonlinear characteristic adapter 114 is changed as follows:

[Numeral 24]

$$\text{Cain\_est}(k) = a1sc\,\text{Cain}(k-1) + a2sc\,\text{Cain}(k-2) + b1sc\,Usl(k-1) + b2sc\,Usl(k-2) + c1(k) \quad (3\text{-}1)$$

In this model, since the influence of disturbance is taken into amount, it becomes unnecessary to eliminate the term concerning the disturbance estimated value from the input. The equations therefore is as follows:

The equations for the nonlinear compensator 112 are as follows:

[Numeral 25]

$$U\text{cain}(k) = dU\text{cain}(k) + Cnl\_adp(k) \quad (3\text{-}2)$$

$$dU\text{cain}(k) = Fnl(dUsl(k)) \quad (3\text{-}3)$$

$$dUsl(k) = Usl(k) - Cnl\_adp(k) \quad (3\text{-}4)$$

The equations for the nonlinear characteristic adapter 114 are as follows:

[Numeral 26]

$$Cnl\_adp(k)Cnl\_\text{base} + Dcnl(k) \quad (3\text{-}5)$$

$$Dcnl(k) = Krch\_cnl\,\sigma cnl(k) + Kadp\_cnl\,\text{sum}\_\sigma cnl(k) \quad (3\text{-}6)$$

$$\sigma cnl(k) = e\_nl(k) + \text{POLE}\_cnl\,e\_nl(k-1) \quad (3\text{-}7)$$

$$e\_nl(k) = \text{Cain\_est}(k) - \text{Cain}(k) \quad (3\text{-}8)$$

$$\text{Cain\_est}(k) = a1sc\,\text{Cain}(k-1) + a2sc\,\text{Cain}(k-2) + b1sc\,Usl(k-1) + b2sc\,Usl(k-2) + c1(k) \quad (3\text{-}9)$$

The characteristics of the linear controller (two-degree-of-freedom response-specifying controller) 110 are as follows:

[Numeral 27]

$$Usl(k) = Ueq(k) + Urch(k) \quad (3\text{-}10)$$

Equivalent Control Input $$Ueq(k) = \frac{1}{b1sc(k)}\{(1 - a1sc(k) - \text{POLE})\,\text{CAIN}(k) + (\text{POLE} - a2sc(k))\,\text{CAIN}(k-1) - b2sc(k)Usl(k-1) - c1(k) + \text{CAIN\_cmd\_f}(k) + (\text{POLE} - 1)\,\text{CAIN\_cmd\_f}(k-1) - \text{POLE}\,\text{CAIN\_cmd\_f}(k-2)\} \quad (3\text{-}11)$$

Reaching Law Input $$Urch(k) = -\frac{Krch}{b1sc(k)}\sigma(k) \quad (3\text{-}12)$$

Switching Function $$\sigma(k) = E\text{cain}(k) + \text{POLE}\,E\text{cain}(k-1) \quad (3\text{-}13)$$

$$E\text{cain}(k) = \text{CAIN}(k) - \text{CAIN\_cmd}\_f(k-1) \quad (3\text{-}14)$$

Desired Value Filter $$\text{CAIN\_cmd}\_f(k) = -\text{POLE}\_f\,\text{CAIN\_cmd}\_f(k-1) + (1 + \text{POLE}\_f)\text{CAIN\_cmd}(k) \quad (3\text{-}15)$$

Krch: Feedback gain
POLE: Switching-function-setting parameter
POLE_f: Desired-value-filter coefficient; Here, −1<POLE_f<POLE<0

The characteristics of the adaptive disturbance observer 102 are as follows:

[Numeral 28]

$$c1(k) = c1(k-1) + \frac{Pdov}{1+Pdov} e\_dov(k) \quad (3\text{-}16)$$

$$e\_dov(k) = CAIN(k) - CAIN\_hat(k) \quad (3\text{-}17)$$

$$CAIN\_hat(k) = \theta^T(k)\zeta(k) \quad (3\text{-}18)$$

$$\theta^T(k) = [a1sc(k)\,a2sc(k)\,b1sc(k)\,b2sc(k)\,c1(k-1)]$$

$$\zeta^T(k) = [CAIN(k-1)\,CAIN(k-2)\,Usl(k-1)\,Usl(k-2)\,1] \quad (3\text{-}19)$$

The equations for the model parameter scheduler 104 are as follows:

[Numeral 29]

$$a1sc(k) \leftarrow a1sc\_map(k) \quad (3\text{-}20)$$

$$a2sc(k) \leftarrow a2sc\_map(k) \quad (3\text{-}21)$$

$$b1sc(k) \leftarrow b1sc\_map(k) \times Kbsc(k) \quad (3\text{-}22)$$

$$b2sc(k) \leftarrow b2sc\_map(k) \times Kbsc(k) \quad (3\text{-}23)$$

In the operation of the plant control system according to the second embodiment, the phase command value (control input) U_cain is calculated in accordance with equations from Eq. 3-2 and on in S200 of FIG. 22.

As mentioned above, In the plant control system according to the second embodiment, since the system further includes: means (linear controller 110, more specifically the adaptive disturbance observer 102 that constitutes it) for calculating a disturbance estimated value c1 applied to the variable phase mechanism (plant) 42; and the linear characteristic adapter (correcting means) 114 calculates the output estimated value Cain_est using the disturbance estimated value c1, it becomes similarly possible to prevent the plant output from exhibiting overshooting relative to the desired value and to further improve the control ability, since the disturbance compensation by the disturbance estimated value c1 and correction of the nonlinear characteristic adapter 114 do not interfere with each other. Thus, the plant control system according to the second embodiment can obtain the same control result (shown in FIG. 20) as that of the first embodiment. It should be noted that the linear controller 110, etc., are, in fact, processing conducted by the ECU 80.

Third Embodiment

Figure 25:
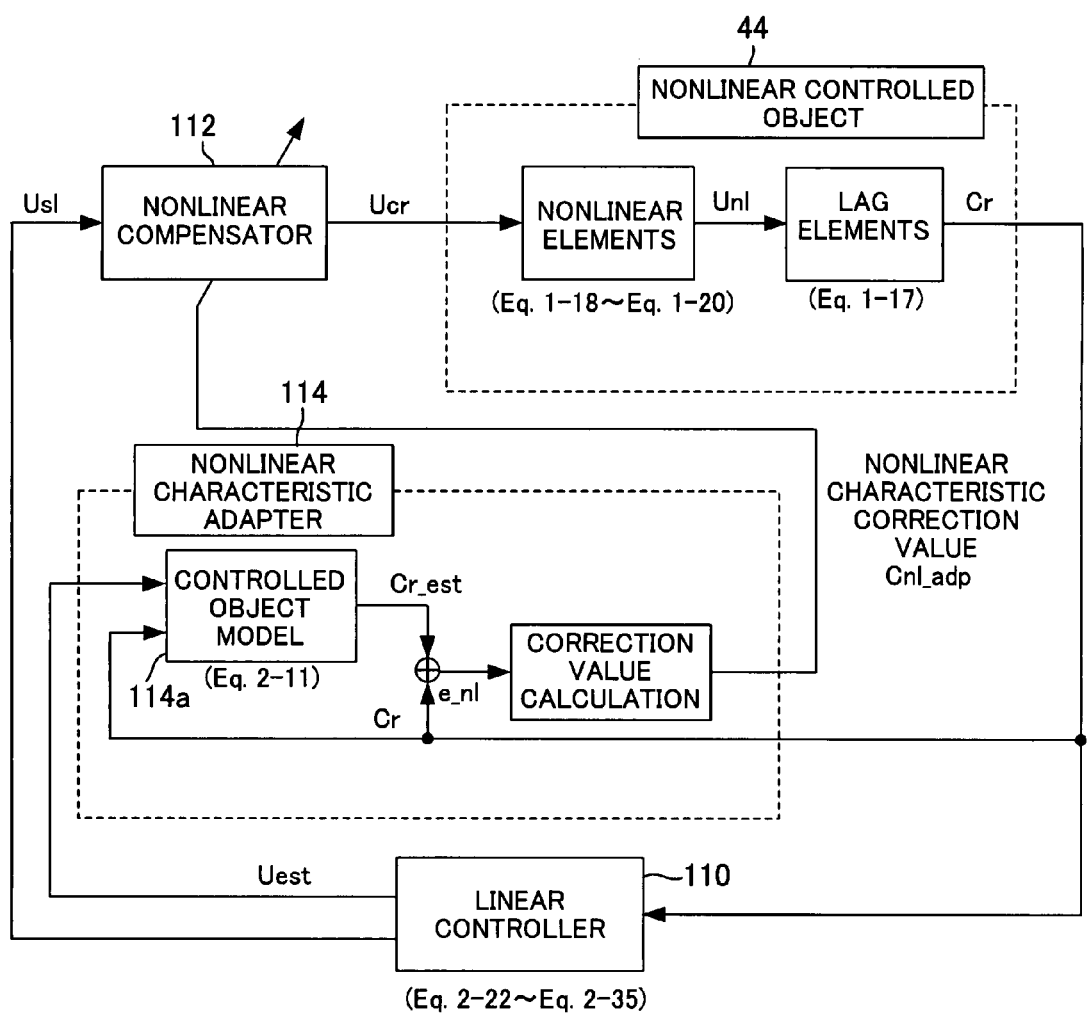
FIG. 25 is a schematic diagram similar to FIG. 19 but showing the overall structure of a plant control system according to a third embodiment of this invention.

FIG. 25 is a schematic diagram, similar to FIG. 19, but showing the overall structure of a plant control system according to the third embodiment of the invention.

The control systems of the first and second embodiments can be applied not only to the variable phase mechanism 42, but also to the other such as the variable compression ratio mechanism 44. As mentioned above with reference to FIG. 2, the quad-link variable compression ratio mechanism 44 increases or decreases the compression ratio by rotating the movable shaft 44c2 (shown in FIG. 2) by the hydraulic mechanism 44e.

Figure 26:
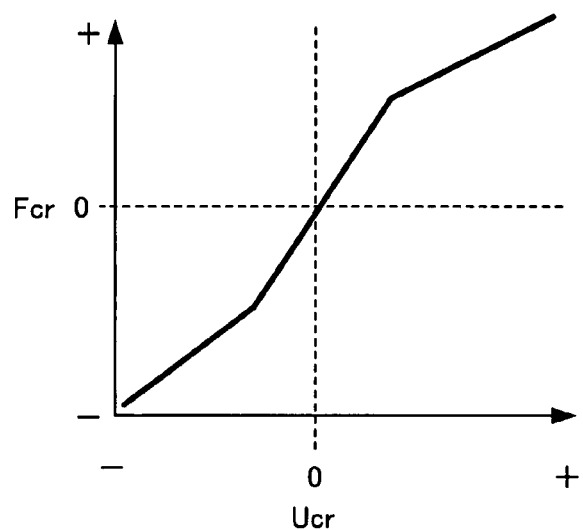
FIG. 26 is a graph showing the characteristics of force Fcr generated in response to control input Ucr of hydraulic mechanism of a variable compression ratio mechanism shown in FIG. 2.

At this time, as shown in FIG. 26, characteristics of generated force Fcr of the hydraulic mechanism 44e relative to the control input Ucr are nonlinear. In order to rotate the movable shaft 44c2 of the variable compression ratio mechanism 44 shown in FIG. 2, the force Fcr must be large. Since high-pressurized oil must accordingly be used, when opening area of oil passage in the control valve (not shown) is slightly changed, i.e., the plus/minus direction is changed, the characteristics of the force Fcr exhibit sharp change as shown in FIG. 26.

Figure 27:
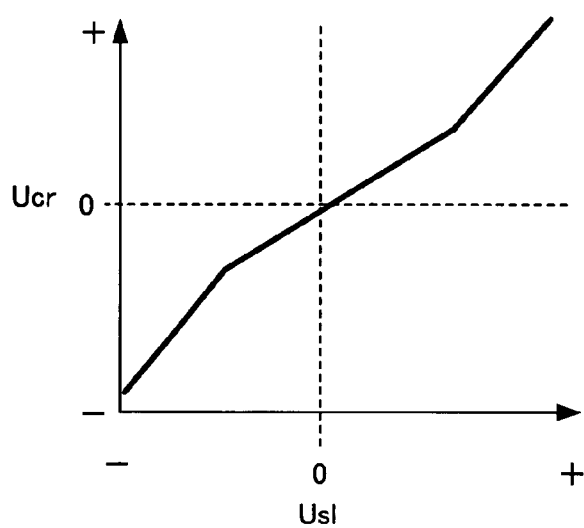
FIG. 27 is a graph showing nonlinear table characteristics used in a nonlinear compensator in the control system shown in FIG. 25.

For that reason, the variable compression ratio mechanism 44 can also be modeled by nonlinear elements and linear elements (lag elements) that represent the characteristics shown in FIG. 26, and as illustrated in FIG. 25, can be controlled by the control system explained in the first embodiment or second embodiment. In that case, nonlinear table characteristics to be used in the nonlinear compensator 112 are those shown in FIG. 27. As regards equations, it suffices if Cain is replaced with Cr in the equations used in the first and second embodiments.

Using the control system shown in FIG. 25, the system according to the third embodiment can improve the control ability markedly.

As mentioned above, the third embodiment provides a system for controlling the variable compression ratio mechanism (plant) 44 of the engine 10 having the linear element and nonlinear element, and calculating control input Ucr based on the linear controller 110 that calculates a provisional input Usl to converge an output of the plant Cr to the compression ratio desired value (desired value) Cr_cmd in accordance with response-specifying control algorithm (more specifically, two-degree-of-freedom response-specifying sliding mode control algorithm) based on the linear element, and on the nonlinear compensator (table characteristics of FIG. 27) 112 set to cancel the provisional input and characteristics of the nonlinear element of the plant; characterized by: the nonlinear characteristic adapter (correcting means) 114 for correcting the nonlinear compensator 112 based on an error e_nl between an output estimated value Cr_est of the plant calculated by a controlled object (estimated model; Eq. 2-1, Eq. 2-11, Eq. 3-1) 114a solely comprising the linear element and the output Cr of the plant. It should be noted that the linear controller 110, etc., are, in fact, processing conducted by the ECU 80.

With this, even when the nonlinear characteristics of the variable compression ratio mechanism (plant) 44 change due to manufacturing variance or aging degradation, it becomes possible to accurately compensate the nonlinear characteristics by the nonlinear compensator 112, and to control the plant output Cr to its desired value Cr_cmd with high accuracy and high response.

Further, since the nonlinear characteristic adapter (correcting means) 114 corrects the nonlinear compensator 112 in accordance with response-specifying control algorithm such that the error e_nl between the output estimated value Cr_est and the output Cr becomes zero, in addition to the effects mentioned above, it becomes possible to improve the control ability, since it becomes possible to make the correction of the nonlinear compensator 112 immediately without causing overshooting to occur.

Further, since the system further includes: means (linear controller 110, more specifically the adaptive disturbance observer 102 that constitutes it) for calculating a disturbance estimated value c1 applied to the variable phase mechanism (plant) 42; and the nonlinear characteristic adapter (correcting means) 114 calculates the output estimated value Cr_est based on a value Uest obtained by subtracting a term (value obtained by eliminating the term) concerning the disturbance estimated value c1 from the control input Ucr (according to Eq. 2-19), in addition to the effects mentioned above, it becomes possible to prevent the plant output Cr from exhibiting overshooting relative to the desired value Cr_cmd and to further improve the control ability, since the disturbance compensation by the disturbance estimated value c1 by the adaptive disturbance observer 102 and correction by the nonlinear characteristic adapter 114 do not interfere with each other.

Further, since the plant is the variable compression ratio mechanism 44 that regulates the compression ratio of the engine 10, in addition to the effects mentioned in the first and second embodiments, at the time of switching increase/decrease of the compression ratio, it becomes possible to control to change the compression ratio, not abruptly, but smoothly.

It should be noted in the above that it is alternatively possible to combine the third embodiment with the first or second embodiment and to control both the variable phase mechanism 42 and variable compression ratio mechanism 44 by the control system mentioned above.

It should also be noted in the above that, although the nonlinear characteristic correction value is calculated in accordance with the equations using the simplified sliding mode control algorithm, other back stepping control mode algorithm or PID control can instead be used.

It should further be noted in the above that, although the simplified sliding mode control algorithm is used in the lift control and ignition timing control, other sliding mode control can instead be used. Further, any other control including adaptive control or PID control can instead be used.

It should further be noted that the variable lift mechanism, variable phase mechanism and variable compression ratio mechanism are not limited to the shown examples.

INDUSTRIAL APPLICABILITY

According to the invention, in a plant control system calculating control input Ucain, Ucr based on a linear controller that calculates a provisional input Usl to converge an output of the plant to a desired value in accordance with control algorithm based on the linear element, and on a nonlinear compensator set to cancel the provisional input and characteristics of the nonlinear element of the plant; correcting means is provided for correcting the nonlinear compensator based on an error e_nl between an output estimated value Cain_est of the plant calculated by an estimation model solely comprising the linear element and the output Cain of the plant, even when the nonlinear characteristics of the plant change due to manufacturing variance or aging degradation, it becomes possible to accurately compensate the nonlinear characteristics by the nonlinear compensator, and to provide a system that controls the plant output to its desired value with high accuracy and high response.

The invention claimed is:

1. A system for controlling a plant having a linear element and a nonlinear element, comprising:
   a linear controller that calculates a provisional input to converge an output of the plant to a desired value in accordance with control algorithm based on the linear element;
   a nonlinear compensator that is set to cancel the provisional input and characteristics of the nonlinear element of the plant using a nonlinear function that inputs the provisional input and calculates a control input; and
   a nonlinear characteristic adaptor that corrects the nonlinear compensator based on an error between an output estimated value of the plant calculated by an estimation model solely comprising the linear element and the output of the plant.

2. The system according to claim 1 wherein the nonlinear characteristic adapter corrects the nonlinear compensator in accordance with response-specifying control algorithm such that the error between the output estimated value and the output becomes zero.

3. The system according to claim 1 further including:
   an adaptive disturbance observer that calculates a disturbance estimated value applied to the plant;
   and the nonlinear characteristic adapter calculates the output estimated value based on a value obtained by eliminating a term concerning the disturbance estimated value from the control input.

4. The system according to claim 2, further including:
   an adaptive disturbance observer that calculates a disturbance estimated value applied to the plant;
   and the nonlinear characteristic adapter calculates the output estimated value based on a value obtained by eliminating a term concerning the disturbance estimated value from the control input.

5. The system according to claim 1, further including:
   an adaptive disturbance observer that calculates a disturbance estimated value applied to the plant;
   and the nonlinear characteristic adapter calculates the output estimated value using the disturbance estimated value.

6. The system according to claim 2, further including:
   an adaptive disturbance observer that calculates a disturbance estimated value applied to the plant;
   and the nonlinear characteristic adapter calculates the output estimated value using the disturbance estimated value.

7. The system according to claim 1, wherein the plant is a variable phase mechanism that variably regulates a phase of an intake valve of an internal combustion engine.

8. The system according to claim 2, wherein the plant is a variable phase mechanism that variably regulates a phase of an intake valve of an internal combustion engine.

9. The system according to claim 3, wherein the plant is a variable phase mechanism that variably regulates a phase of an intake valve of an internal combustion engine.

10. The system according to claim 1, wherein the plant is a variable compression ratio mechanism that regulates a compression ratio of an internal combustion engine.

11. The system according to claim 2, wherein the plant is a variable compression ratio mechanism that regulates a compression ratio of an internal combustion engine.

12. The system according to claim 3, wherein the plant is a variable compression ratio mechanism that regulates a compression ratio of an internal combustion engine.

* * * * *